United States Patent
Jin et al.

(10) Patent No.: US 12,237,474 B2
(45) Date of Patent: Feb. 25, 2025

(54) SOLID ELECTROLYTE-BASED MOLTEN LITHIUM ELECTROCHEMICAL CELLS

(71) Applicant: MetaGenesis, Ltd., Sunnyvale, CA (US)

(72) Inventors: Yang Jin, Zhengzhou (CN); Kai Liu, Beijing (CN); Jialiang Lang, Fushun (CN)

(73) Assignee: MetaGenesis, Ltd., Sunnyvale, CA (US)

( * ) Notice: Subject to any disclaimer, the term of this patent is extended or adjusted under 35 U.S.C. 154(b) by 877 days.

(21) Appl. No.: 16/978,520

(22) PCT Filed: Mar. 5, 2019

(86) PCT No.: PCT/CN2019/076966
§ 371 (c)(1),
(2) Date: Sep. 4, 2020

(87) PCT Pub. No.: WO2019/170074
PCT Pub. Date: Sep. 12, 2019

(65) Prior Publication Data
US 2021/0020996 A1    Jan. 21, 2021

(30) Foreign Application Priority Data
Mar. 8, 2018 (WO) .............. PCT/CN2018/078399

(51) Int. Cl.
*H01M 10/39* (2006.01)
*H01M 4/04* (2006.01)
(Continued)

(52) U.S. Cl.
CPC ....... *H01M 10/399* (2013.01); *H01M 4/0471* (2013.01); *H01M 4/131* (2013.01);
(Continued)

(58) Field of Classification Search
None
See application file for complete search history.

(56) References Cited

U.S. PATENT DOCUMENTS

2014/0272481 A1* 9/2014 Chung ................ H01M 50/121
429/103
2016/0351970 A1* 12/2016 Dürr ................... H01M 10/399
(Continued)

FOREIGN PATENT DOCUMENTS

| CN | 204289603 A | 4/2015 |
| CN | 104701588 A | 6/2015 |

(Continued)

OTHER PUBLICATIONS

Aono, H., Sugimoto, E., Sadaoka, Y., Imanaka, N., & Adachi, G. Y. (1990). Ionic conductivity and sinterability of lithium titanium phosphate system. Solid State Ionics, 40, 38-42. (Year: 1990).*

(Continued)

*Primary Examiner* — Haroon S. Sheikh
*Assistant Examiner* — Claire A Rutiser
(74) *Attorney, Agent, or Firm* — Sheppard, Mullin, Richter & Hampton LLP; Xin Xie

(57) ABSTRACT

Molten lithium electrochemical cells are disclosed. A solid electrolyte separates a molten lithium metal or molten lithium metal alloy from a cathode. The molten lithium cells provide high Coulombic efficiency and energy efficiency at operating temperatures less than 600° C. The cells are useful for stationary energy storage in power grids.

6 Claims, 23 Drawing Sheets

(51) Int. Cl.
| | |
|---|---|
| *H01M 4/131* | (2010.01) |
| *H01M 4/134* | (2010.01) |
| *H01M 4/505* | (2010.01) |
| *H01M 4/525* | (2010.01) |
| *H01M 4/58* | (2010.01) |
| *H01M 4/75* | (2006.01) |
| *H01M 10/0525* | (2010.01) |
| *H01M 10/0562* | (2010.01) |

(52) U.S. Cl.
CPC .......... *H01M 4/134* (2013.01); *H01M 4/505* (2013.01); *H01M 4/525* (2013.01); *H01M 4/58* (2013.01); *H01M 4/75* (2013.01); *H01M 10/0525* (2013.01); *H01M 10/0562* (2013.01)

(56) References Cited

U.S. PATENT DOCUMENTS

2017/0214106 A1   7/2017   Johnson et al.
2018/0301754 A1*  10/2018  Badding ............... C04B 35/481

FOREIGN PATENT DOCUMENTS

| CN | 106159318 A | 11/2016 | |
|---|---|---|---|
| CN | 106711382 A * | 5/2017 | ............ H01M 2/145 |
| CN | 106711465 A | 5/2017 | |
| CN | 106784623 A | 5/2017 | |
| DE | 102016214399 A1 | 2/2018 | |

OTHER PUBLICATIONS

Ramakumar, S., Deviannapoorani, C., Dhivya, L., Shankar, L. S., & Murugan, R. (2017). Lithium garnets: Synthesis, structure, Li+ conductivity, Li+ dynamics and applications. Progress in Materials Science, 88, 325-411. (Year: 2017).*
Wang, et al. "Lithium-antimony-lead liquid metal battery for grid-level energy storage." Nature 514.7522 (2014): 348-350. (Year: 2014).*
CN-106711382-A translation from Espacenet 2017.*
International Search Report and Written Opinion for PCT/CN2019/076966 dated Apr. 28, 2019, 6 pages.
Extended European Search Report for EP Application 19764789.4 dated Nov. 9, 2021, 9 pages.
Anonymous, "Solid State Lithium-Sulfur Battery", ip.com, ip.com No. IPCOM000248824D, Jan. 13, 2017, 4 pages.

* cited by examiner

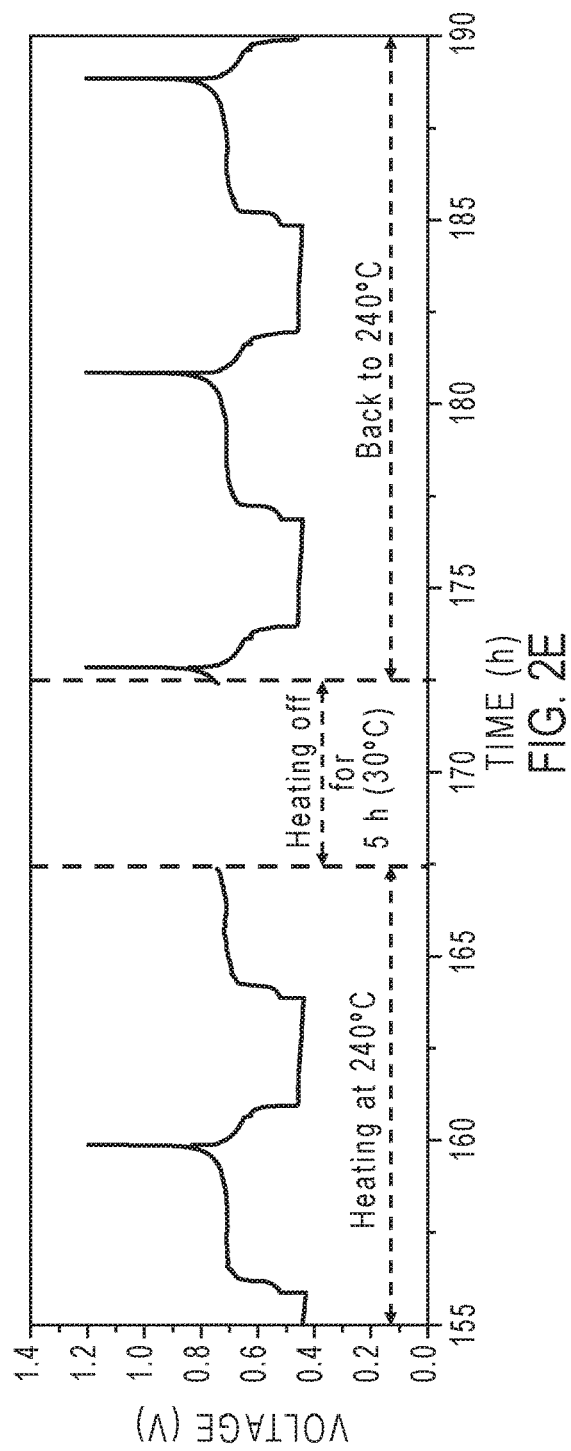
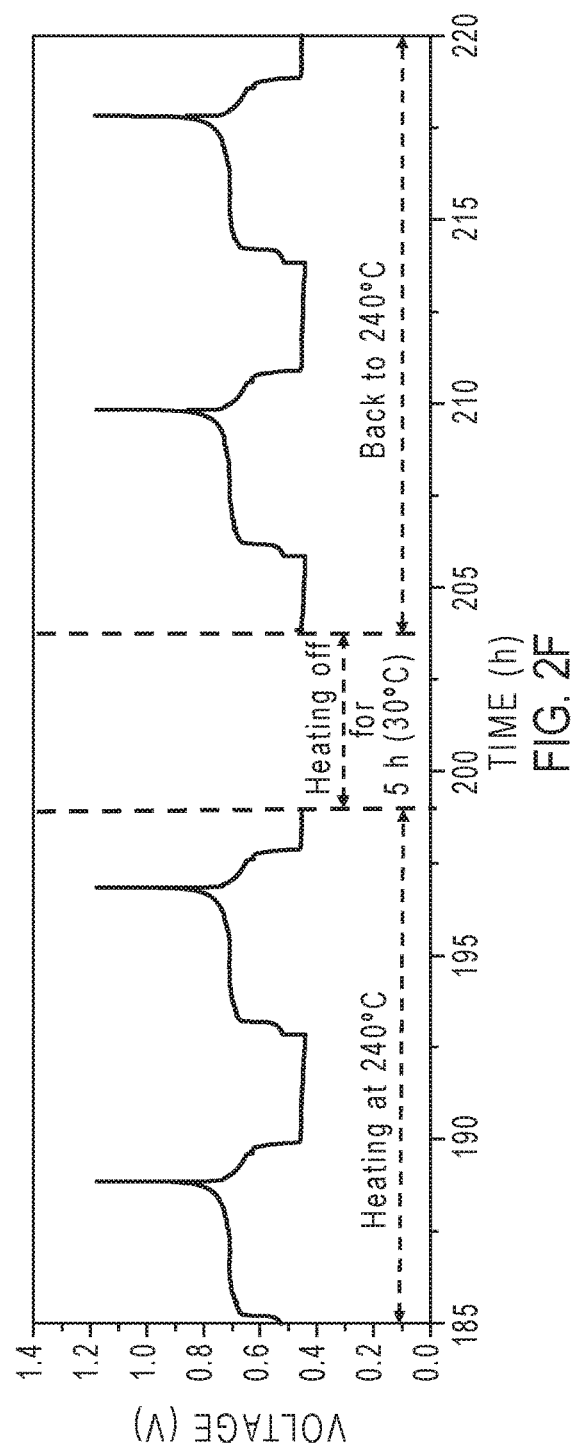

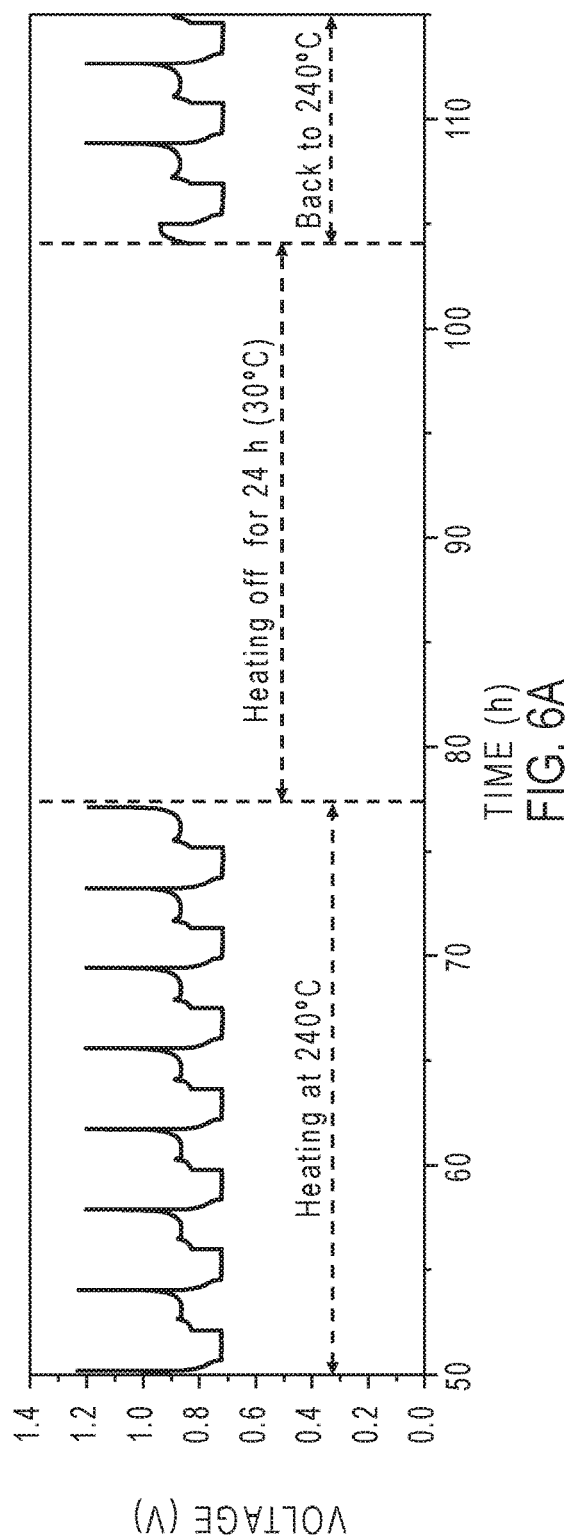
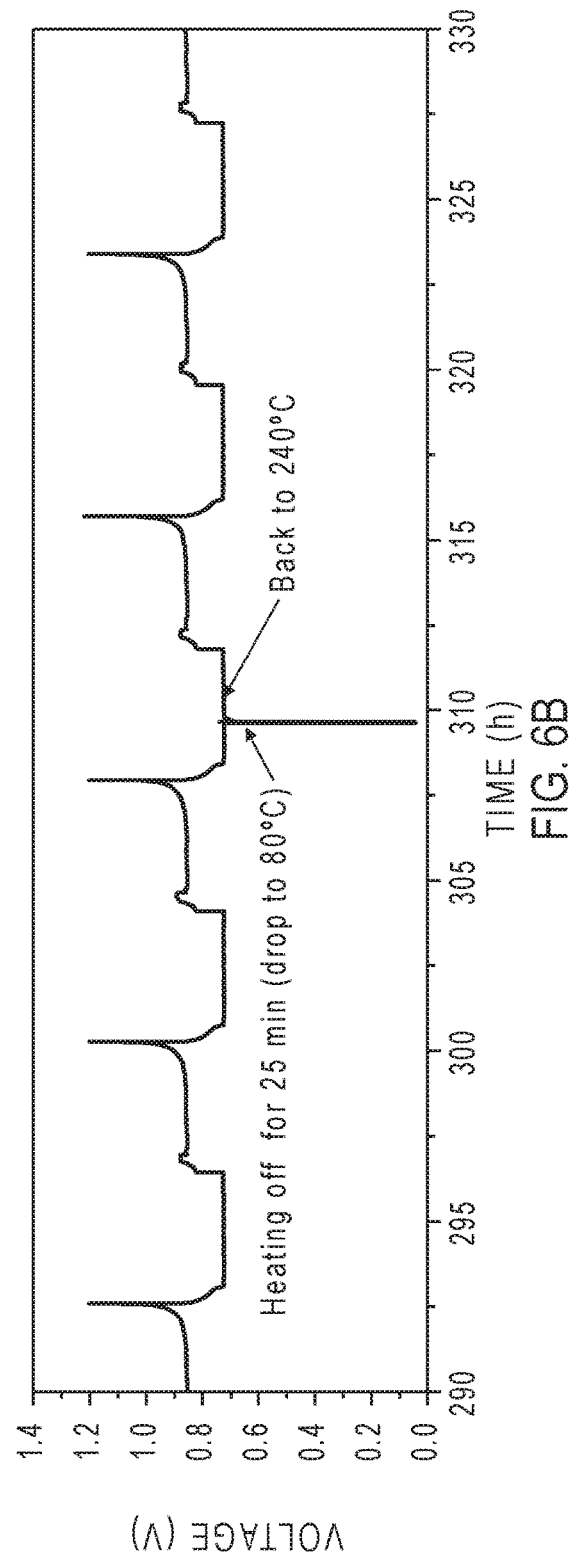
FIG. 6A
FIG. 6B

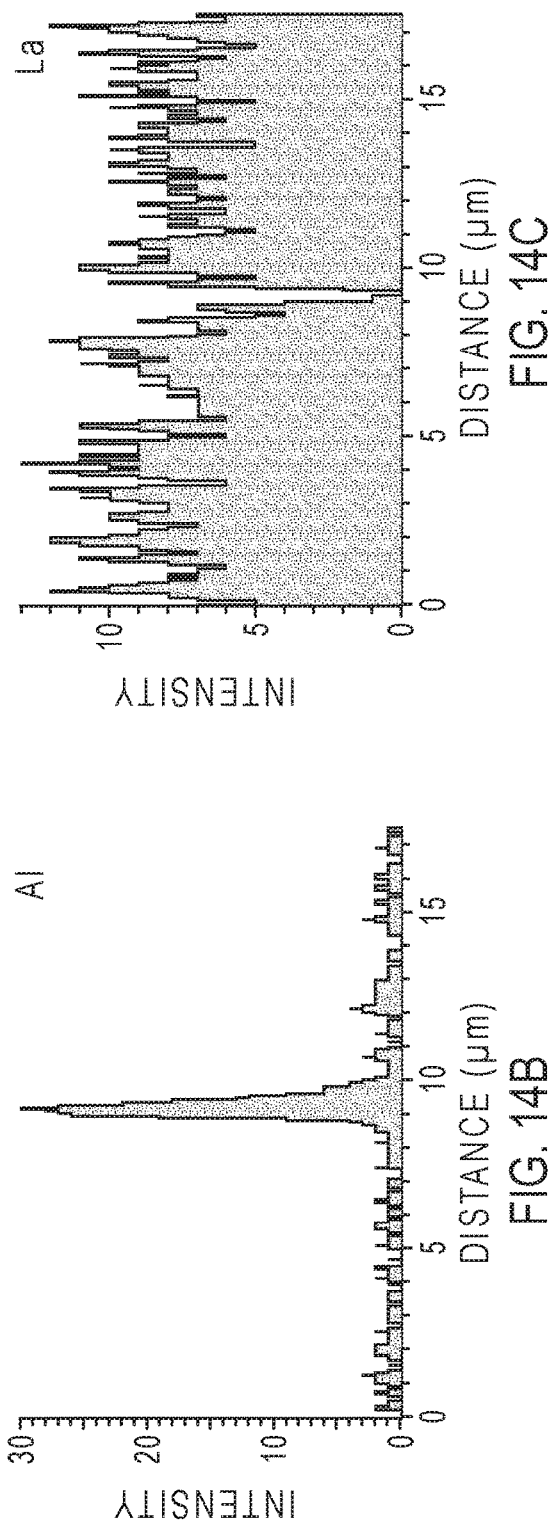
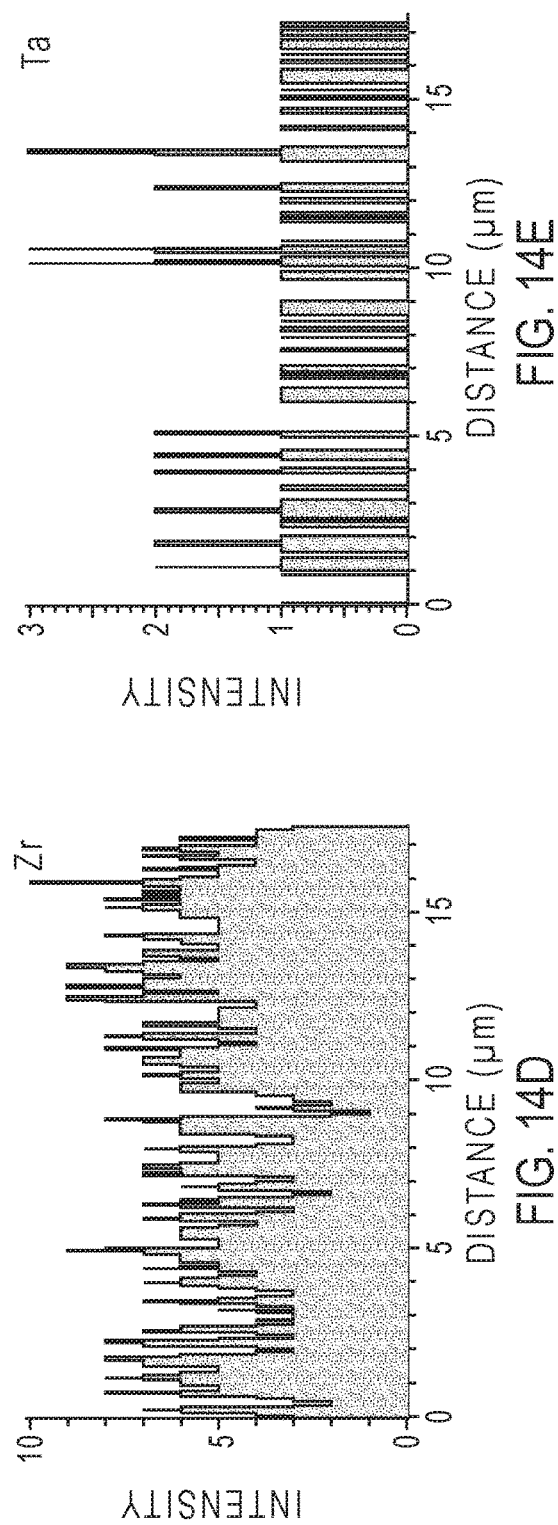
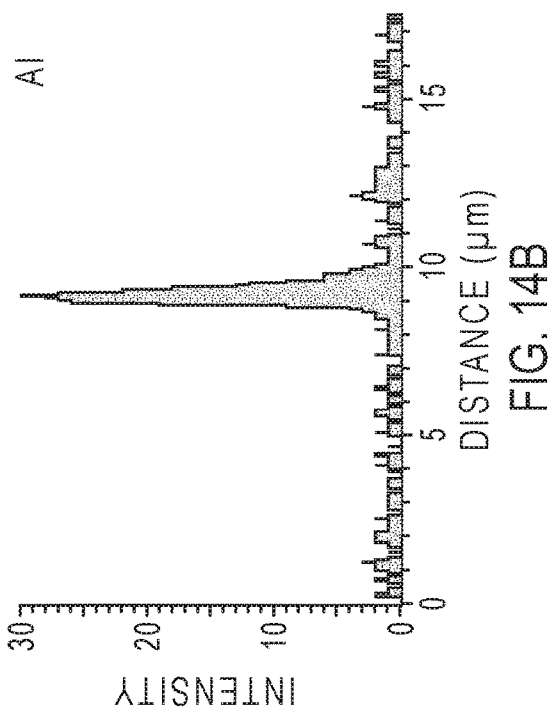
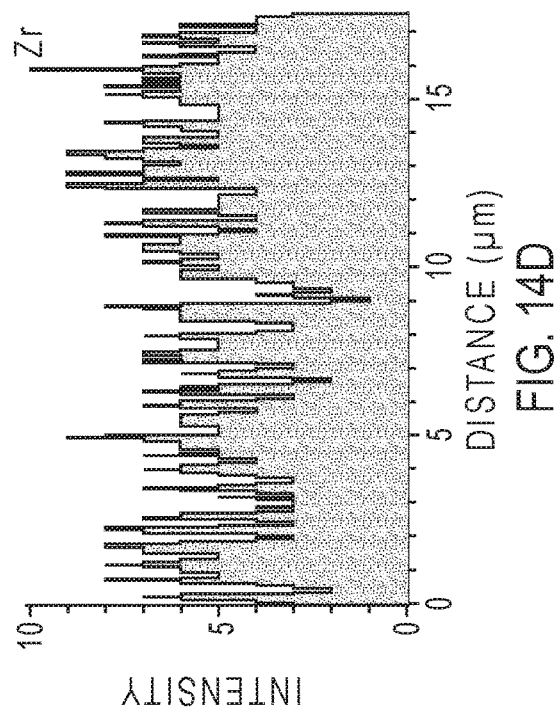
FIG. 14B
FIG. 14C
FIG. 14D
FIG. 14E

SOLID ELECTROLYTE-BASED MOLTEN LITHIUM ELECTROCHEMICAL CELLS

CROSS REFERENCE TO RELATED APPLICATIONS

This application is a U.S. National Stage Application under 35 U.S.C. 371 of International Application No. PCT/CN2019/076966, filed Mar. 5, 2019, which claims priority to PCT/CN2018/078399, filed Mar. 8, 2018. The contents of each of the aforementioned are hereby incorporated by reference in their entirety into the present disclosure.

FIELD

The invention relates to molten lithium electrochemical cells. A solid electrolyte separates a molten lithium metal or molten lithium alloy from a cathode. The molten lithium cells provide high Coulombic efficiency and energy efficiency at operating temperatures less than 600° C. The cells are useful for stationary energy storage in power grids.

BACKGROUND

Power grids including smart power grids require highly reliable and low-cost rechargeable batteries to integrate renewable energy sources as a stable and flexible power source and to facilitate distributed energy storage. Liquid metal electrode (LME)-based batteries exhibit excellent properties such as low cost, scalability, dendrite-free cycling, high power capability, and long-term reliability.

Lithium represents the best choice for the anode of LME batteries in part because it is the lightest metal and has the lowest electrode potential (−3.04 V compared to standard hydrogen potential) among all elements. Previously reported lithium-based LME batteries employed molten liquid lithium salts as the electrolyte. Lithium salts have a high melting temperature resulting in battery operating temperatures of 400° C. or higher. The high operating temperatures result in high maintenance costs, corrosion and safety issues, and makes it difficult to maintain a hermetic seal during the useful battery life. Furthermore, the dissolution of lithium in the molten lithium salts leads to non-negligible self-discharge and relatively low Coulombic efficiencies of less than 98%.

Improved batteries for stationary energy storage are desired.

SUMMARY

According to the present invention, an electrochemical cell, comprises an anode, wherein the anode comprises lithium metal or a lithium alloy; a cathode in spaced relation to the anode, wherein the cathode comprises a cathode material reactive with the anode; and a solid electrolyte positioned between the anode and the cathode, wherein the solid electrolyte comprises a lithium ion conductive oxide, a lithium ion conductive phosphate, a lithium ion conductive sulfide, or a combination of any of the foregoing.

According to the present invention, a power module comprises one or more of the electrochemical cells according to the present invention.

According to the present invention, a power system comprises one or more of the power modules according to the present invention.

According to the present invention, a power grid comprises one or more of the power modules according to the present invention.

BRIEF DESCRIPTION OF THE DRAWINGS

The drawings described herein are for illustration purposes only. The drawings are not intended to limit the scope of the present disclosure.

FIGS. 2E and 2F show freezing and thawing performance of a Li∥LLZTO∥Sn—Pb cell during charge and discharge, respectively. Sn (1.567 g) and Pb (0.91 g) were used as the cathode material.

FIG. 4A shows voltage profiles during charge-discharge cycling, FIG. 4B shows representative charge-discharge voltage profiles before the addition of Pb to the cell, and FIG. 4C shows representative charge-discharge voltage profiles after Pb was added to a Li∥LLZTO∥Sn cell. The cathode contained 2.073 g Sn and 0.91 g Pb was added when the Li∥LLZTO∥Sn cell capacity dropped to zero at about the 20th cycle.

FIGS. 6A-6B show freezing and thawing performance of a Li∥LLZTO∥Bi—Pb cell during charge and discharge, respectively. The cathode contained 3 g Bi and 1 g Pb.

Figure 7:
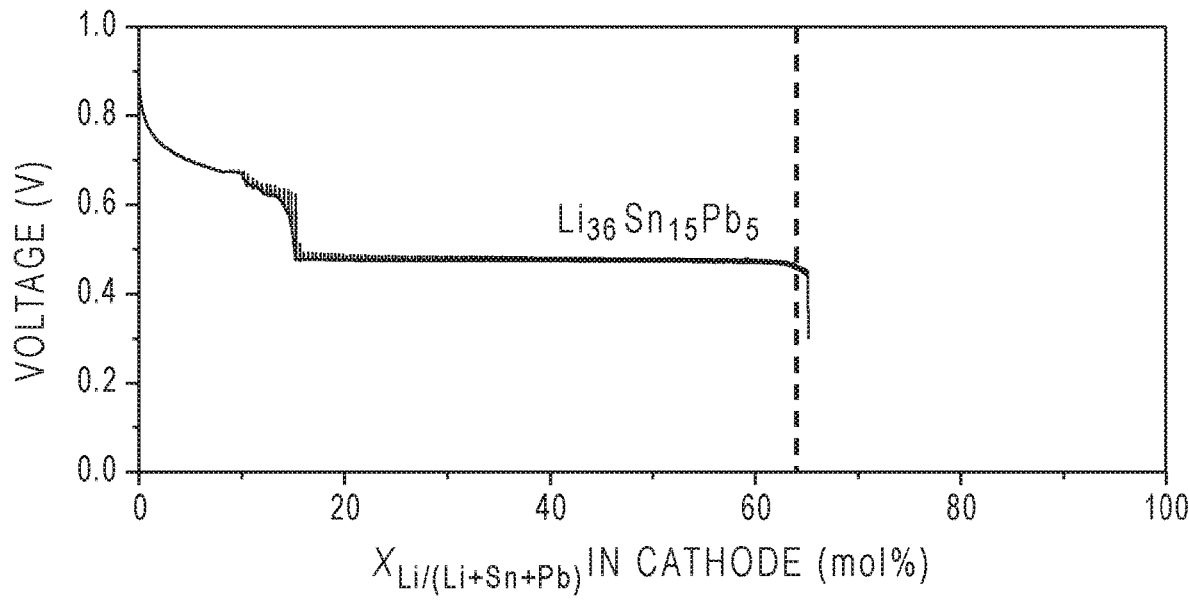

FIG. 7 shows a Coulometric titration of a Li∥LLZTO∥Sn—Pb cell operating at 240° C.

Figure 8:
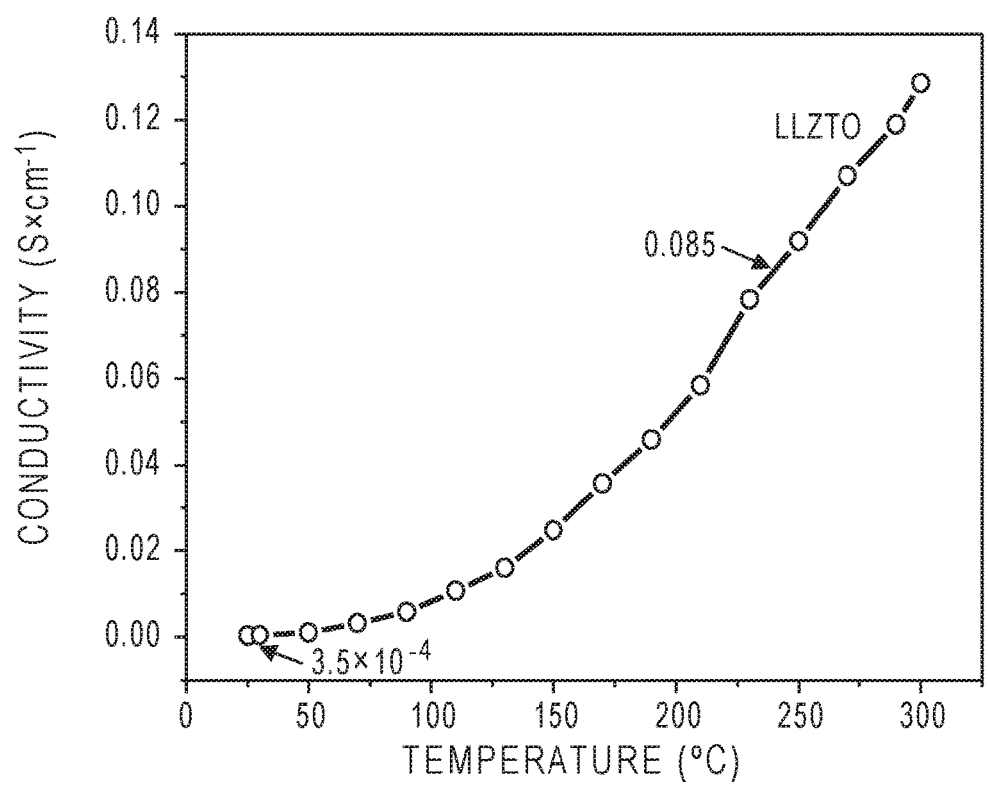

FIG. 8 shows the ionic conductivity of an LLZTO pellet over a temperature range from 25° C. to 300° C.

Figure 9:
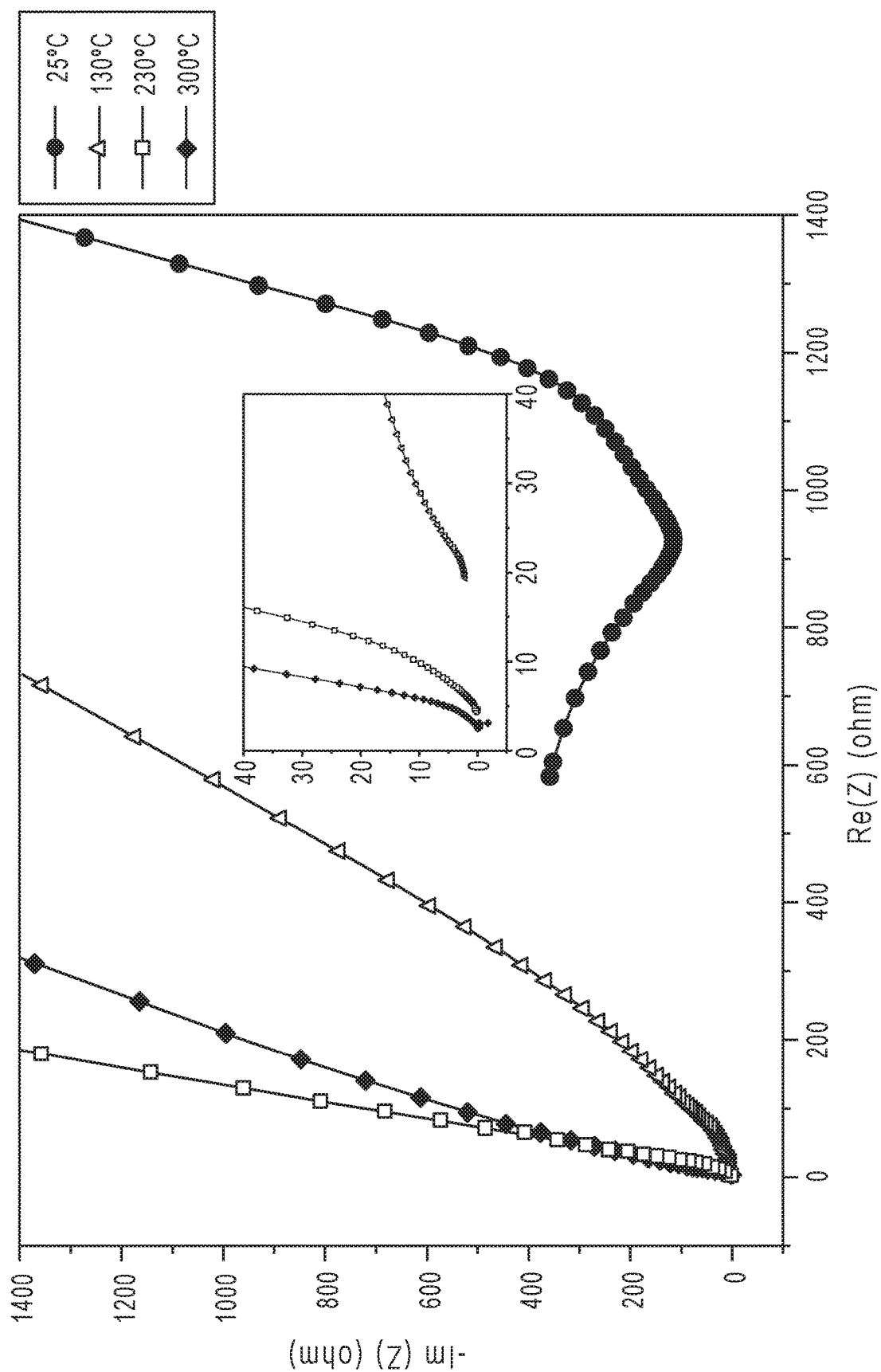

FIG. 9 shows EIS measurements of a LLZTO pellet at temperatures of 25° C., 130° C., 230° C., and 300° C.

FIGS. 10A-10D show scanning electron microscopy (SEM) images of the surface of an LLZTO solid electrolyte tube (FIGS. 10A and 10B) and of the interior of a LLZTO solid electrolyte tube (FIGS. 10C and 10D) prepared using methods provided by the present disclosure.

Figure 11:
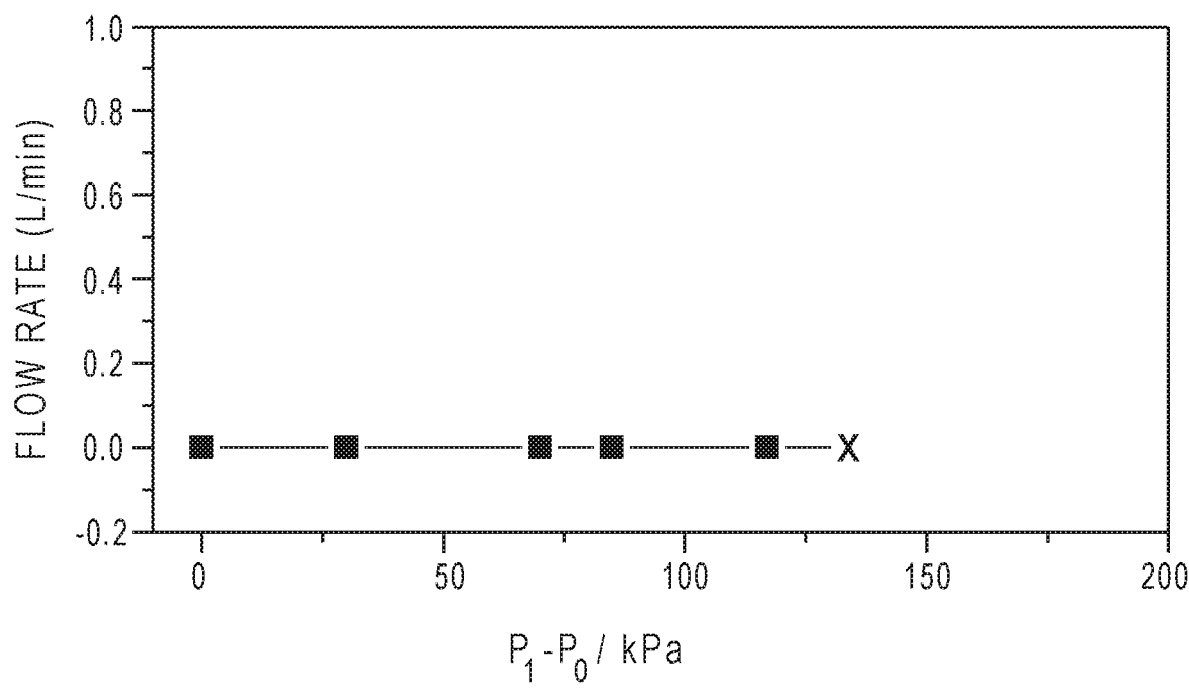

FIG. 11 shows flow rate of air across a 200 μm-thick sheet of LLZTO with increasing pressure.

Figure 12:
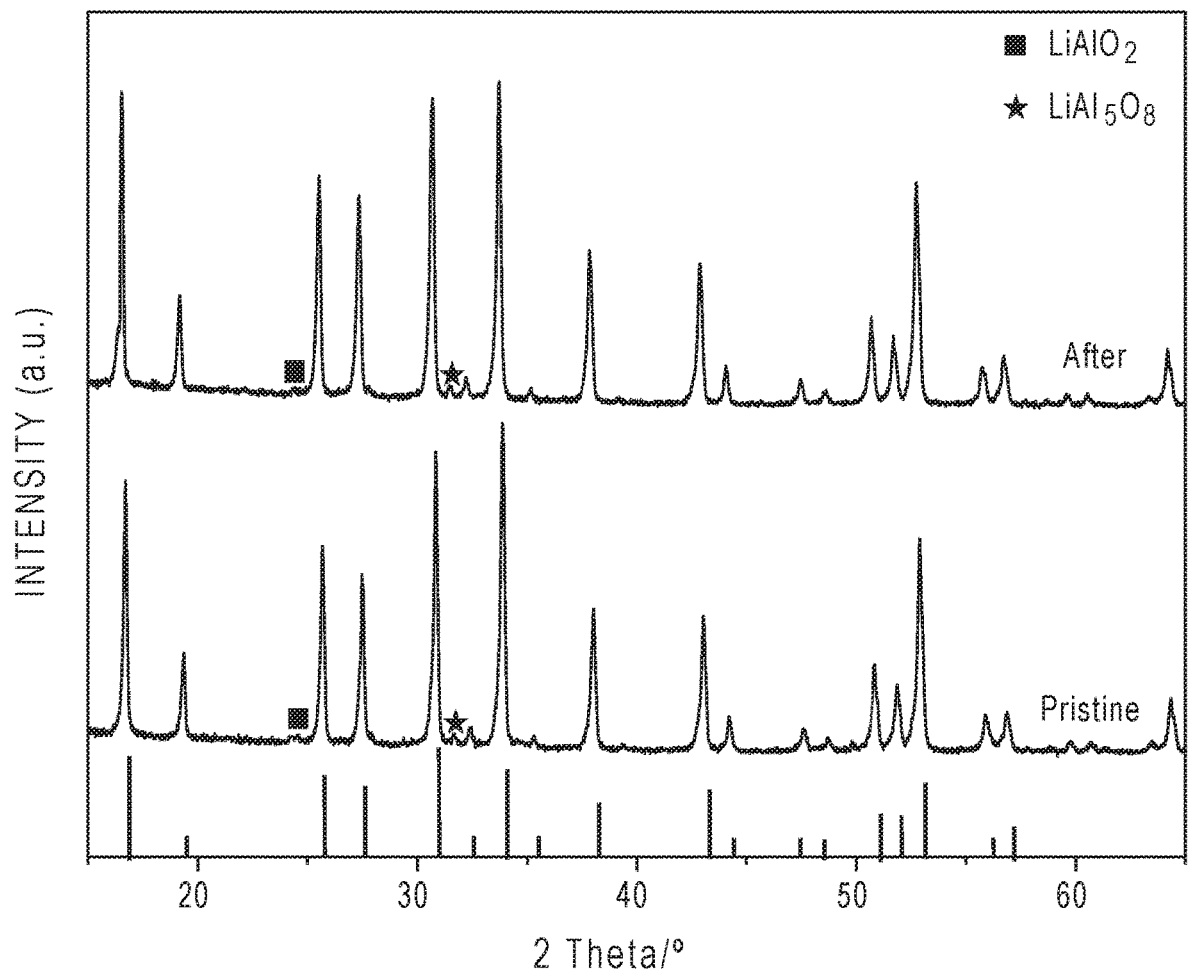

FIG. 12 shows X-ray diffraction (XRD) patterns for a LLZTO electrolyte tube before and after immersion in molten lithium for 2 months at 300° C.

Figure 13:
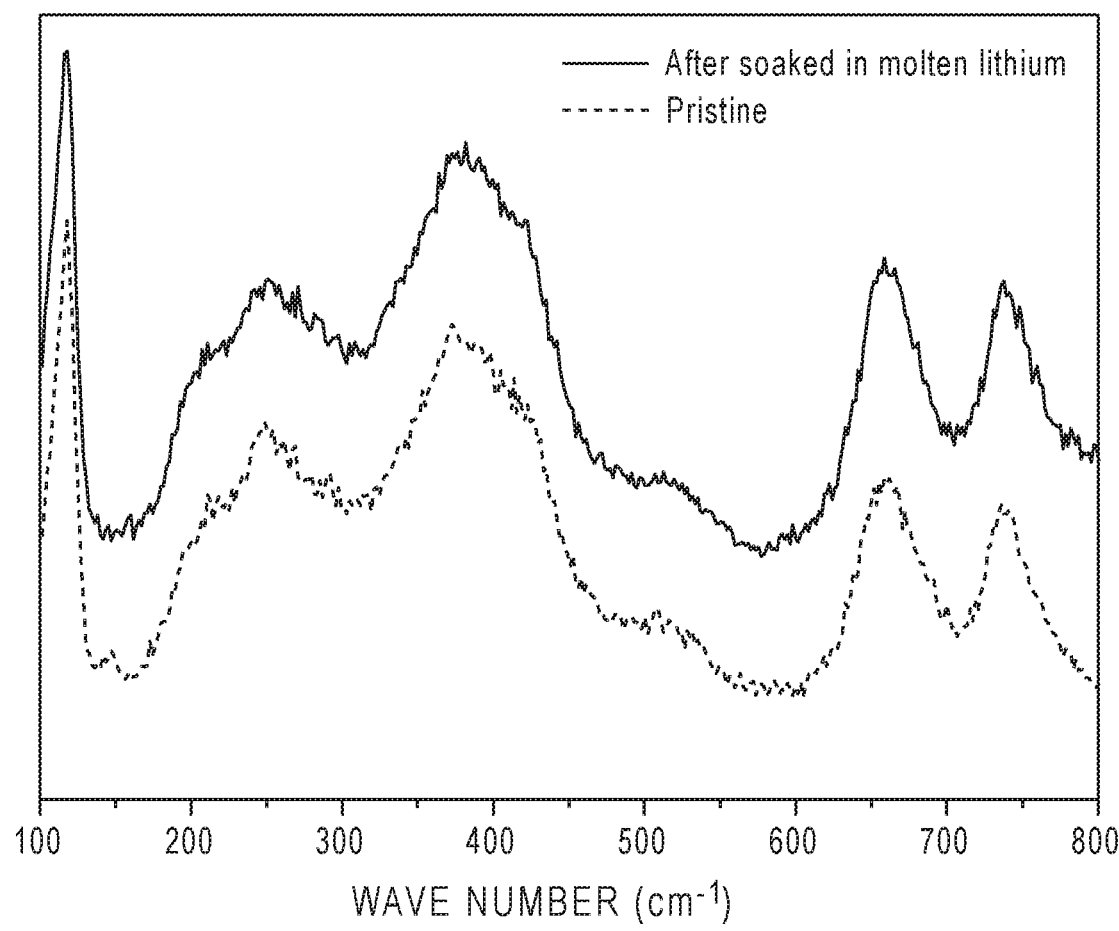

FIG. 13 shows Raman spectra for a LLZTO tube before and after immersion in molten lithium for 2 months at 300° C.

Figure 14A:
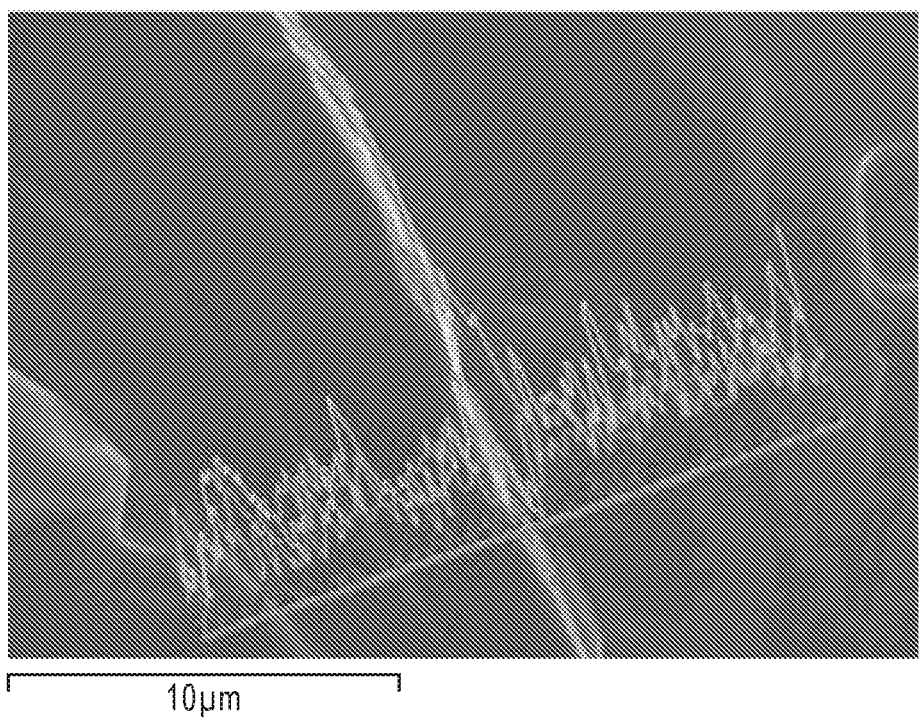

FIGS. 14A-14E show electron dispersive spectroscopy (EDS) line analysis along a cross-section of a LLZTO tube after immersion in molten lithium for 2 months at 300° C. FIG. 14A shows the composite line analysis, and FIGS. 14B-14E shows the line analysis for each of the elements Al, Ta, Zr, and Ta, respectively.

Figure 15:
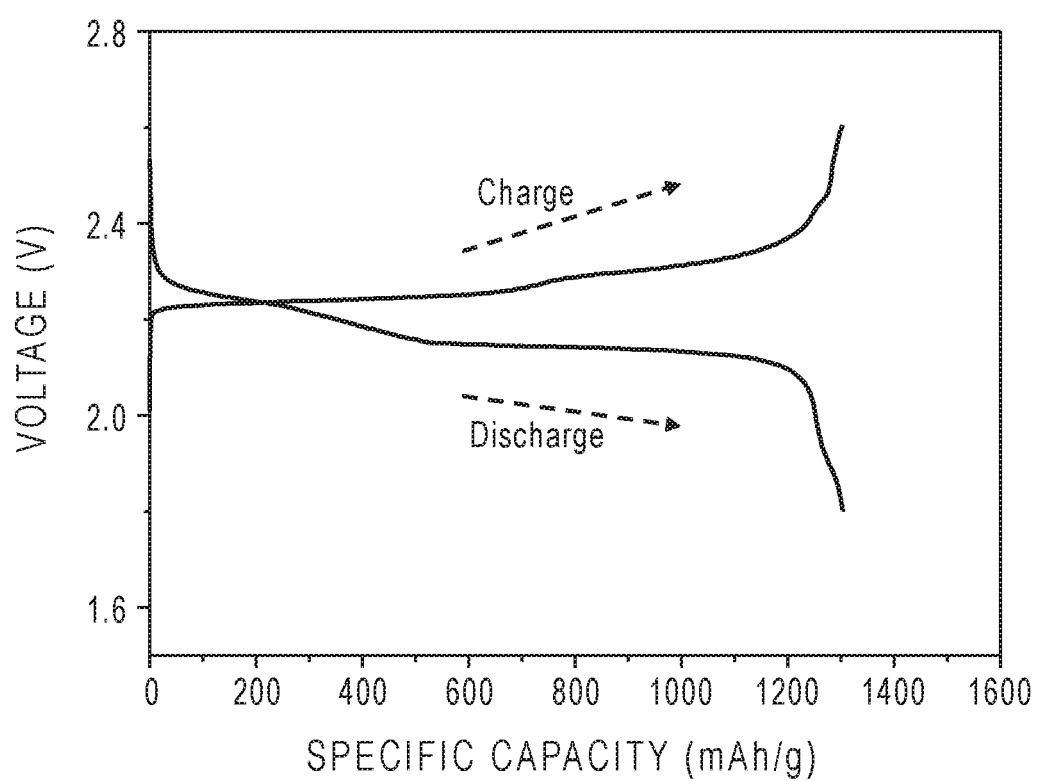

FIG. 15 shows representative charge-discharge voltage profiles for a Li∥LLZTO∥S cell operating at 240° C.

Figure 16A:
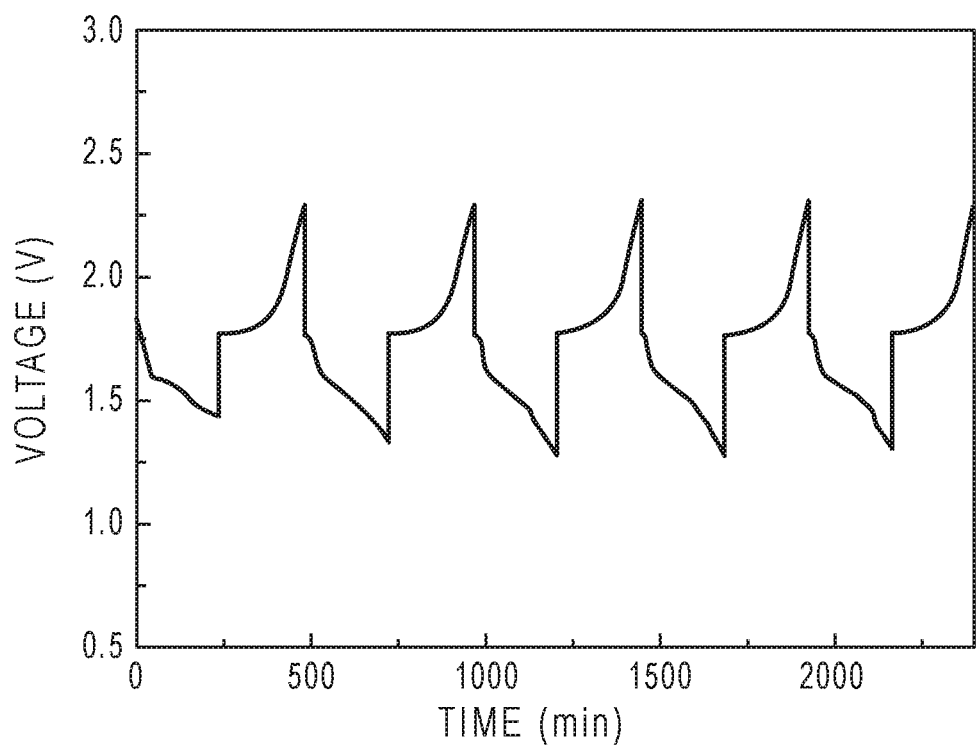

FIG. 16A show voltage profiles for a Li∥LLZTO∥AlCl$_3$—LiCl cell operating at 210° C. during multiple charge-discharge cycles at 10 mA×cm$^{-2}$.

Figure 16B:
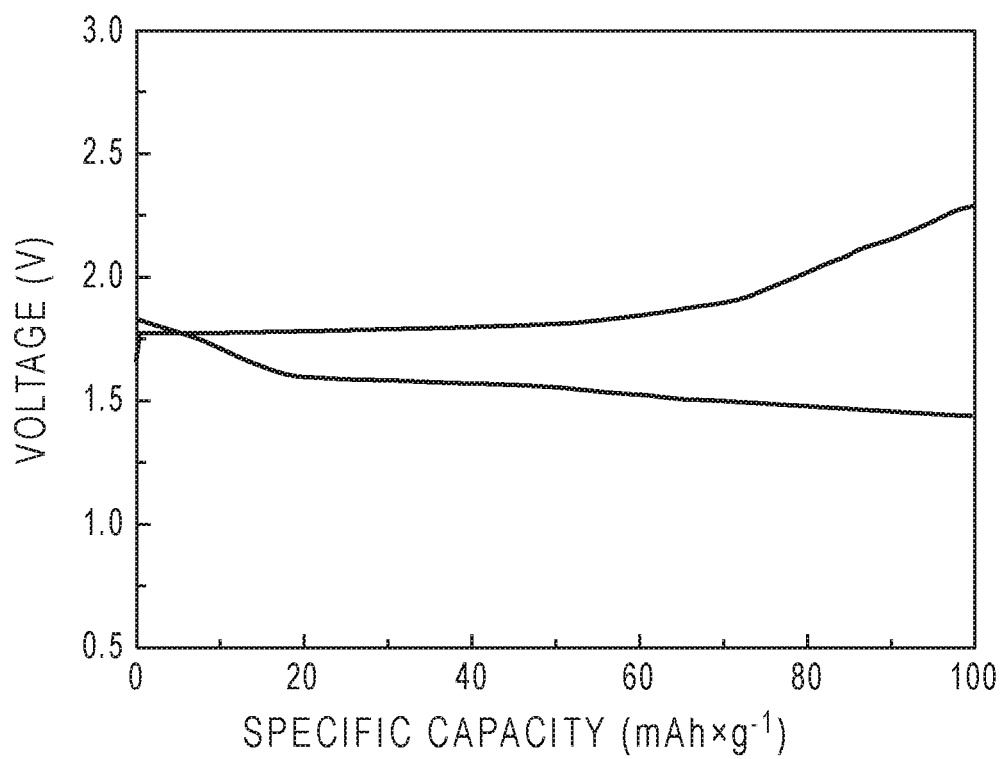

FIG. 16B shows a representative charge-discharge voltage profile during the first charge-discharge cycle for a Li∥LLZTO∥AlCl$_3$—LiCl cell operating at 210° C.

Figure 17:
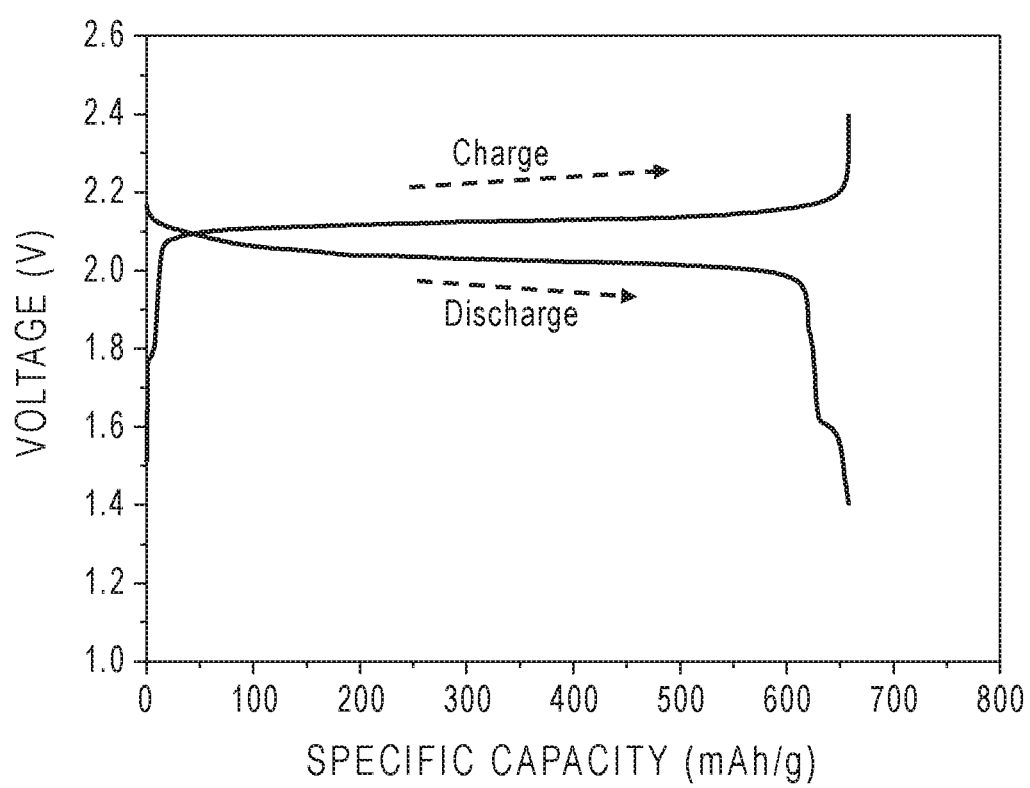

FIG. 17 shows representative charge-discharge voltage profiles for a Li∥LLZTO∥Se cell operating at 240° C.

Reference is now made in detail to certain embodiments of the present disclosure. While certain embodiments of the present disclosure are described, it will be understood that it is not intended to limit the embodiments of the present disclosure to the disclosed embodiments. To the contrary, reference to embodiments of the present disclosure is intended to cover alternatives, modifications, and equivalents as may be included within the spirit and scope of the embodiments of the present disclosure as defined by the appended claims.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

Electrochemical cells refer to devices for storing and generating electrical energy including batteries. Electrochemical cells provided by the present disclosure can be rechargeable.

Lithium ion solid electrolytes can provide a high level of safety and reliability by physically and electrically separating the lithium anode and the cathode materials without self-discharge and without lithium penetration or solubility issues. Garnet-type solid electrolytes have attracted increasing attention due to their high lithium ion conductivity, stability in the presence of lithium metal, and wide electrochemical performance window.

The ionic conductivity of garnet-type solid electrolytes increases at elevated temperatures to greater than 60 mS×cm$^{-1}$ at temperatures above 200° C. Moreover, when a solid electrolyte is used in a system operating above the melting point of lithium (180° C.) or lithium alloy, a liquid-solid interface is created instead of a solid-solid interface. As a result, the interfacial impedance between the anode and the garnet-type solid electrolyte is reduced.

Electrochemical cells provided by the present disclosure comprise an anode, wherein the anode comprises lithium metal or a lithium alloy; a cathode in spaced relation to the anode, wherein the cathode comprises a material reactive with the anode; and a solid electrolyte between the anode and the cathode.

An electrochemical cell provided by the present disclosure can comprise an anode, wherein the anode comprises lithium metal or a lithium alloy; a cathode in spaced relation to the anode, wherein the cathode comprises a cathode material reactive with the anode; and a solid electrolyte positioned between the anode and the cathode, wherein the solid electrolyte comprises a lithium ion conductive oxide, a lithium ion conductive phosphate, a lithium ion conductive sulfide, or a combination of any of the foregoing.

Figure 1:
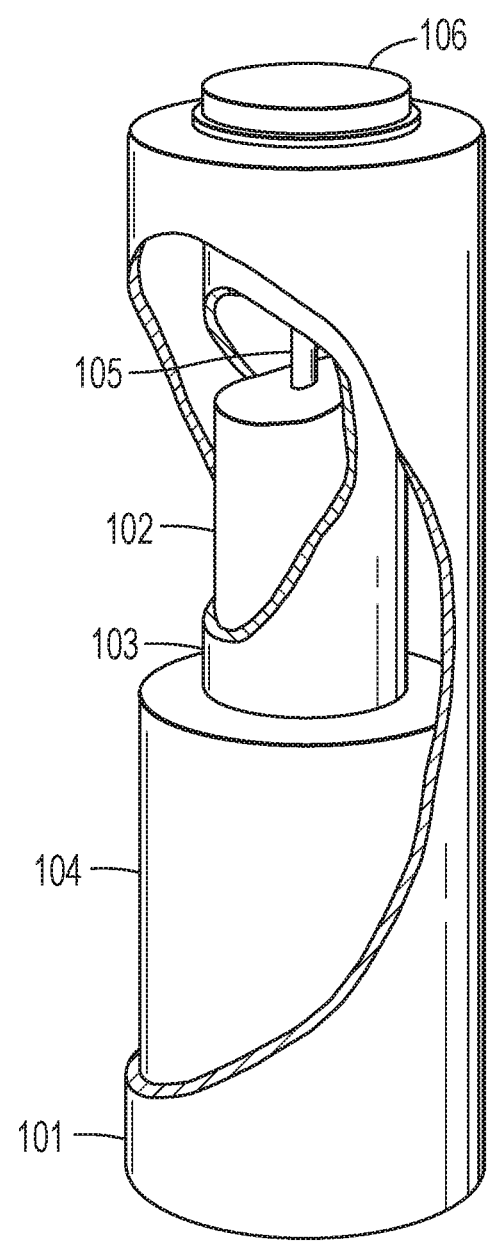
FIG. 1 shows a cross-sectional view of an example of a lithium∥solid electrolyte∥cathode electrochemical cell provided by the present disclosure.

A schematic of an example of an electrochemical cell such as a battery provided by the present disclosure is shown in FIG. 1. The battery includes an anode 102 comprising lithium metal or a lithium metal alloy, a solid electrolyte 103 adjacent anode 102 and separating the anode from cathode 104. An anode current collector 105 is in contact with anode 102 and is electrically connected to negative electrode 106. The cathode 104 is electrically connected to cylinder 101, which serves as a positive electrode.

The solid electrolyte can be in the form of an open-ended cylinder or a cylinder in which one of the ends is closed. The one or two open ends of the cylinder can be sealed with a material capable of maintaining the integrity of the seal under operating conditions such as temperatures less than 600° C., and during temperature cycling from 0° C. to 600° C. and when exposed to molten lithium and/or molten lithium alloy.

The anode current collector can comprise any suitable material such as, for example, stainless steel, copper, copper alloy, carbon, graphite, or a combination of any of the foregoing. An anode current collector can be inert upon exposure to molten lithium and/or molten lithium alloy.

The cathode current collector can comprise any suitable material such as, for example, stainless steel, copper, copper alloy, carbon, graphite, or a combination of any of the foregoing.

Other configurations of an electrochemical cell than the configuration illustrated in FIG. 1 are possible. For example, the anode, solid electrolyte, and/or cathode can be in the form of parallel plates separating the lithium metal anode from the cathode.

The anode can comprise lithium metal or a lithium alloy.

The lithium metal can comprise, for example, greater than 99.99 mol % lithium, greater 99.9 mol % lithium, or greater than 99 mol % lithium, where mol % is based on the total moles of elements in the composition.

A suitable lithium alloy can have a melting temperature less than 600° C., less than 500° C., less than 400° C., or less than 300° C. A suitable lithium metal alloy can have a melting temperature, for example, within a range from 120° C. to 600° C., within a range from 120° C. to 500° C., within a range from 120° C., to 400° C., or within a range from 120° C. to 300° C.

Examples of suitable lithium metal alloys include, for example, Li—Al, Li—Ag, Li—Si, and Li—Sn.

Under operating conditions, electrochemical cells provided by the present disclosure can be heated above the melting temperature of the anode material such that during operation the lithium metal or lithium metal alloy is molten. For example, under operating conditions, the temperature of the cell can be less than 600° C., less than 500° C., less than 400° C., or less than 300° C., and above the melting point of the lithium metal or lithium metal alloy.

The cathode can comprise any suitable material that is reactive with the lithium alloy anode.

The cathode can comprise a metallic material, a non-metallic material, or a gaseous material.

Examples of suitable metallic and non-metallic cathode materials include Sn, Pb, Bi, Sb, S, Se, metal halides, metal oxides, metal chalcogenides, or alloys of any of the foregoing, or combinations of any of the foregoing.

A metallic cathode material can comprise, for example, Sn, Pb, Bi, Sb, an alloy of any of the foregoing, or a combination of any of the foregoing.

A metallic cathode material can comprise, for example, SnPb alloy such as $Sn_{15}Pb_5$, BiPb alloy such as $Bi_3Pb$, or a combination thereof.

A cathode material can comprise a Sn—Pb eutectic alloy, a Bi—Pb eutectic alloy, or a combination thereof. A cathode material can comprise a Sn—Pb eutectic alloy, wherein the eutectic alloy comprises 75.25 mol % Sn and 24.75 mol % Pb, wherein mol % is based on the total moles of Sn and Pb in the alloy. A cathode material can comprise a Sn—Pb alloy, wherein the Sn—Pb alloy comprises from 70 mol % to 80 mol % Sn, and from 20 mol % to 30 mol % Pb, wherein mol % is based on the total moles of Sn and Pb in the alloy. A cathode material can comprise a Bi—Pb eutectic alloy, wherein the eutectic alloy comprises 75.25 mol % Bi and 24.75 mol % Pb, wherein mol % is based on the total moles of Bi and Pb in the alloy. A cathode material can comprise a Bi—Pb alloy, wherein the Bi—Pb alloy comprises from 70 mol % to 80 mol % Bi, and from 20 mol % to 30 mol % Pb, wherein mol % is based on the total moles of Bi and Pb in the alloy.

A cathode material can comprise S, Se, or a combination thereof.

A non-metallic cathode material can comprise S, Se, a metal halide, a metal oxide, a metal chalcogenide, an alloy of any of the foregoing, or a combination of any of the foregoing.

A non-metallic cathode material can comprise, for example, FeS, $FeS_2$, or a combination thereof.

A non-metallic cathode material can comprise, for example, a metal chloride such as, for example, ferric chloride, aluminum chloride, nickel chloride, or a combination of any of the foregoing.

A metal oxide cathode material can comprise, for example, $Li_4Ti_5O_{12}$, $LiFePO_4$, $LiMn_2O_4$, $LiCoO_2$, $LiNi_xCo_yMn_zO_2$, $V_2O_5$, $TiO_2$, or a combination of any of the foregoing.

Examples of suitable gaseous cathode materials include nitrogen, oxygen, fluorine, chlorine, bromine, iodine, and combinations of any of the foregoing. A gaseous cathode material can include nitrogen, fluorine, bromine, iodine, and combinations of any of the foregoing. A gaseous cathode material can not include oxygen and chlorine.

The solid electrolyte can comprise a material capable of conducting lithium ions. A solid electrolyte also maintains the separation between the lithium metal anode and the cathode during use.

For example, the solid electrolyte can comprise a lithium ion-conductive oxide, a lithium ion-conductive phosphate, a lithium ion-conductive sulfide, or a combination of any of the foregoing.

Examples of suitable lithium ion conductive oxides include garnet-type oxides, lithium super ionic conductor (LISICON)-type oxides, perovskite type oxides, and combinations of any of the foregoing.

A lithium ion conductive oxide can comprise a garnet-type oxide, such as Ta-doped $Li_7La_3Zr_2O_{12}$. A garnet-type oxide can comprise $Li_{7-x}La_3Zr_{2-x}Ta_xO_{12}$, wherein x can be, for example, from 0.1 to 1.0, from 0.2 to 0.9, from 0.3 to 0.8, or from 0.4 to 0.6.

A garnet-type oxide can comprise $Li_{6.5}La_3Zr_{1.5}Ta_{0.5}O_{12}$. A garnet-type oxide can comprise $Li_{6.4}La_3Zr_{1.4}Ta_{0.6}O_{12}$. A garnet-type oxide can comprise $Li_{6.6}La_3Zr_{1.6}Ta_{0.4}O_{12}$. A garnet-type oxide can comprise $Li_{6.5}La_3Zr_{1.5}Ta_{0.5}O_{12}$.

Suitable lithium super ionic conductor (LISICON)-type oxides include for example, $Li_{14}ZnGe_4O_{16}$.

Suitable perovskite-type oxides include, for example, $Li_{3x}La_{2/3-x}TiO_3$ and $La_{(1/3)-x}Li_{3x}NbO_3$, where x can be, for example, from 0.1 to 1.0, from 0.2 to 0.9, from 0.3 to 0.8, or from 0.4 to 0.7.

Examples of suitable lithium ion conductive-phosphates include $Li_{1.4}Al_{0.4}Ti_{1.6}(PO_4)_3$, $LiZr_2(PO_4)_3$, $LiSn_2(PO_4)_3$, and $Li_{1+x}AlGe_{2-x}(PO_4)$, where x can be, for example, from 0.1 to 1.0, from 0.2 to 0.9, from 0.3 to 0.8, or from 0.4 to 0.7.

Examples of suitable lithium ion-conductive sulfides include $Li_2S$—$SiS_2$, $Li_2S$—$GeS_2$—$P_2S_5$, and combinations thereof.

An LLZTO solid electrolyte provided by the present disclosure can have a density greater than 96%, greater than 97%, greater than 98%, or greater than 99%. For example, an LLZTO solid electrolyte can have a density from 96% to 99.9%, from 97% to 99.9%, from 98% to 99.9% or from 98% to 99%.

An LLZTO solid electrolyte provided by the present disclosure can be prepared using high-pressure cold isostatic pressing and spray granulation.

An LLZTO solid electrolyte provided by the present disclosure can have a cross-sectional thickness, for example, from 0.1 cm to 0.6 cm, from 0.15 cm to 0.5 cm, or from 0.2 cm to 4 cm.

A sealant can be used to retain the cathode material during use. The sealant can be in the form of a paste or a gasket.

It is desirable that the gasket material does not degrade and maintains a viable seal under the use conditions of the electrochemical cell. A suitable gasket material will not significantly degrade following long-term exposure to the anode and cathode materials at temperatures within a range from 200° C. to 600° C. or from 200° C. to 300° C.

Suitable gasket materials include elastomers such as silicones, perfluoroethers, polytetrafluoroethylene, and polyepoxides.

Molten lithium-based electrochemical cells were fabricated having a garnet-type $Li_{6.5}La_3Zr_{1.5}Ta_{0.5}O_{12}$ (LLZTO) solid electrolyte tube, and a Sn—Pb or Bi—Pb cathode anode. These cells are referred to as Li‖LLZTO‖Sn—Pb and Li‖LLZTO‖Bi—Pb cells, respectively.

At an operating temperature of 240° C., Li‖LLZTO‖Sn—Pb cells exhibited stable operation for greater than 800 h, a current density up to 500 mA×cm$^{-2}$, a Columbic efficiency of 99.98%, and an energy efficiency of 75% at 50 mA×cm$^{-2}$. At an operating temperature of 240° C., Li‖LLZTO‖Bi—Pb electrochemical cells exhibited a Columbic efficiency of 99.98% and energy efficiency of 84% at 100 mA cm$^{-2}$.

Figure 2A:
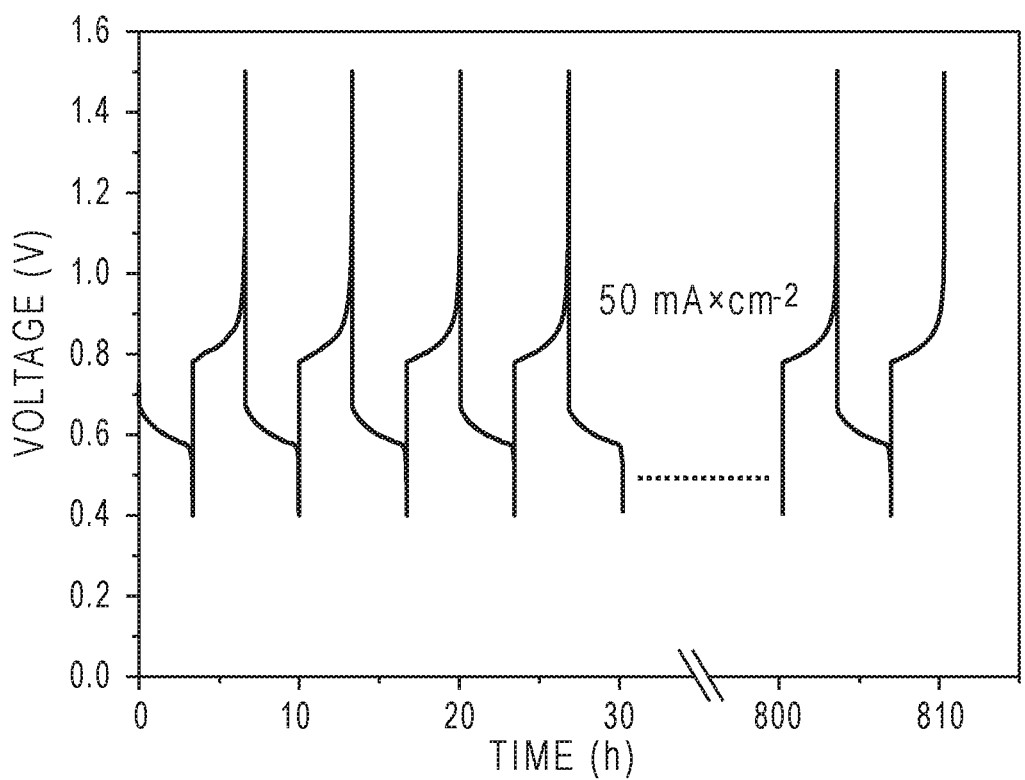
FIG. 2A shows voltage profiles during charge-discharge cycling from 1 to 5 cycles and from 119 to 120 cycles at 50 mA×cm$^{-2}$ for a Li∥LLZTO∥Sn—Pb at a temperature of 240° C.
Figure 2B:
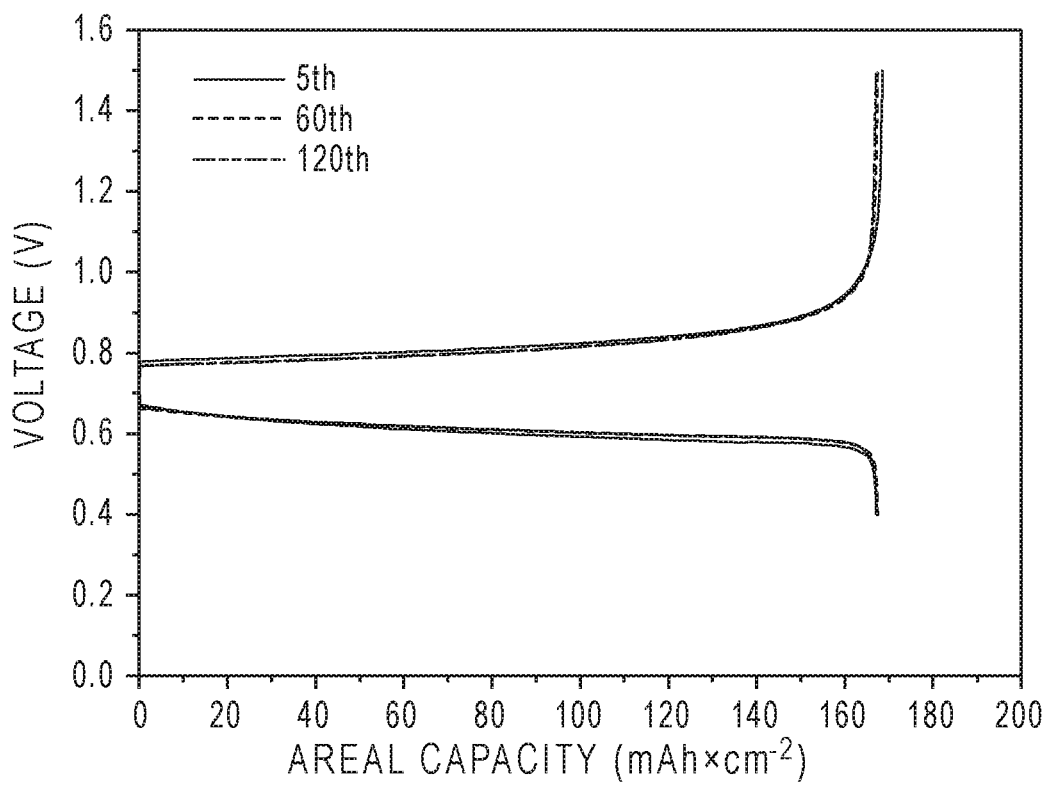
FIG. 2B shows voltage profiles for a Li∥LLZTO∥Sn—Pb cell during the 5th, 60th and 120th charge-discharge cycle.
Figure 2C:
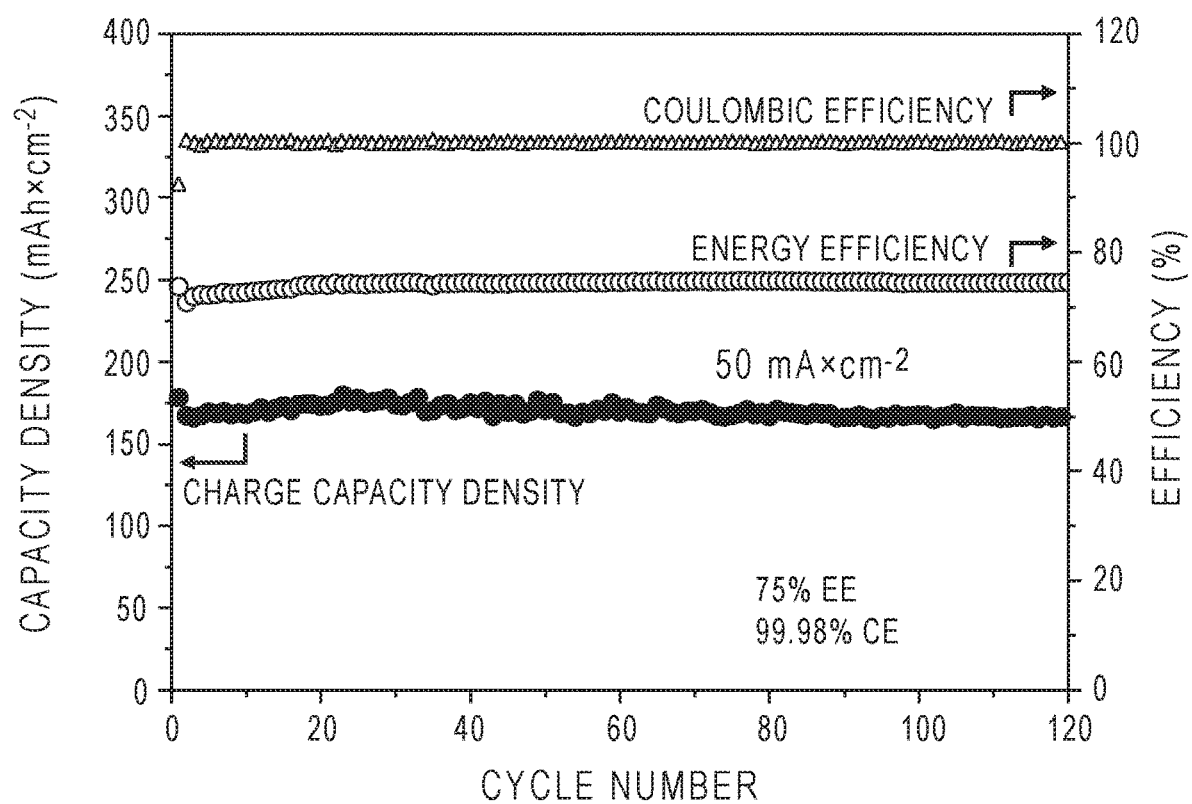
FIG. 2C shows the Coulombic efficiency, energy efficiency, and charge capacity density for a Li∥LLZTO∥Sn—Pb cell as a function of cycle number. Sn (3.561 g) and Pb (2.073 g) were used as the cathode material.

The charge-discharge voltage profiles in FIG. 2A and FIG. 2B show that a Li‖LLZTO‖Sn—Pb cell can be discharged and charged with plateaus of about 0.6 V (charge) and about 0.8 V (discharge), respectively. A Li‖LLZTO‖Sn—Pb cell was cycled at a high current density of 50 mA×cm$^{-2}$ for one month (120 cycles) operating at 240° C. (FIG. 2A). FIG. 2B demonstrates that as the cell is cycled, the cell has a stable areal capacity of about 170 mAh×cm$^{-2}$, which is in agreement with the theoretical capacity corresponding to a discharge product with a Li:Sn:Pb mole ratio of 3:15:5 (see FIG. 7). The capacity decay was small during a charge-discharge cycle. The initial-cycle Columbic efficiency was 93%, and increased to 99.9% during the second cycle, stabilizing above 99.9% during long-term cycling. The average Columbic efficiency reached 99.98%, which is greater than the Columbic efficiency (about 98%) for similar cells using molten salt electrolytes. These results indicate that reaction of the molten lithium metal with the LLZTO solid electrolyte or crossover through the LLZTO tube is negligible. The energy efficiency was stable at 75%. These measurements are shown in FIG. 2C.

Figure 2D:
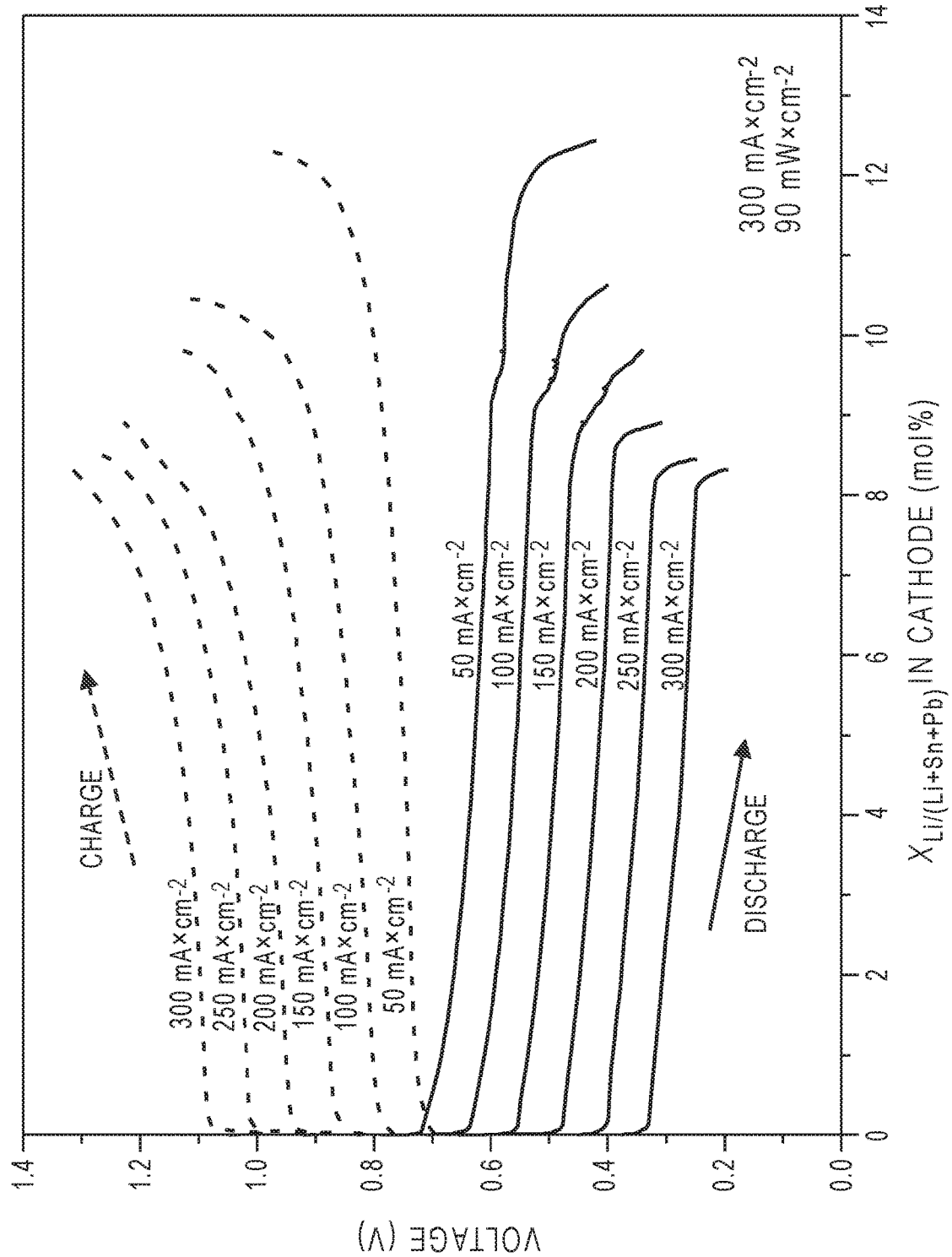
FIG. 2D shows charge-discharge voltage profiles for a Li∥LLZTO∥Sn—Pb cell operating at 240° C. and at different current densities between 50 mA×cm$^{-2}$ and 300 mA×cm$^{-2}$. Sn (1.187 g) and Pb (0.691 g) were used as the cathode material. When discharged to the first voltage, the elemental mole ratio of the discharge product was Li:Sn:Pb=3:15:5.

Grid energy storage requires high power capability to store available renewable energy and to respond quickly to shifts in demand on the grid in order to regulate peak loads. Molten lithium metal electrochemical cells provided by the present disclosure exhibit high power capability. The LLZTO solid electrolyte is able to function effectively in Li‖LLZTO‖Sn—Pb and Li‖LLZTO‖Bi—Pb cells operating at a temperature of 240° C. and at high current densities. Voltage profiles at different current densities ranging from 50 mA×cm$^{-2}$ to 300 mA×cm$^{-2}$ in a Li‖LLZTO‖Sn—Pb are shown in FIG. 2D. For each current density increment of 50 mA×cm$^{-2}$, the average discharge voltage decreased by only 70 mV. Even at a high current density of 300 mA×cm$^{-2}$, the cells exhibited acceptable cycling performance with a discharge voltage plateau of 0.3 V, which is about 62% of the theoretical capacity. The high-power capability reflects the high ionic conductivity of the LLZTO solid electrolyte at 240° C. and the favorable lithium ion charge transfer kinetics at the liquid electrode-solid electrolyte interfaces.

Figure 3A:
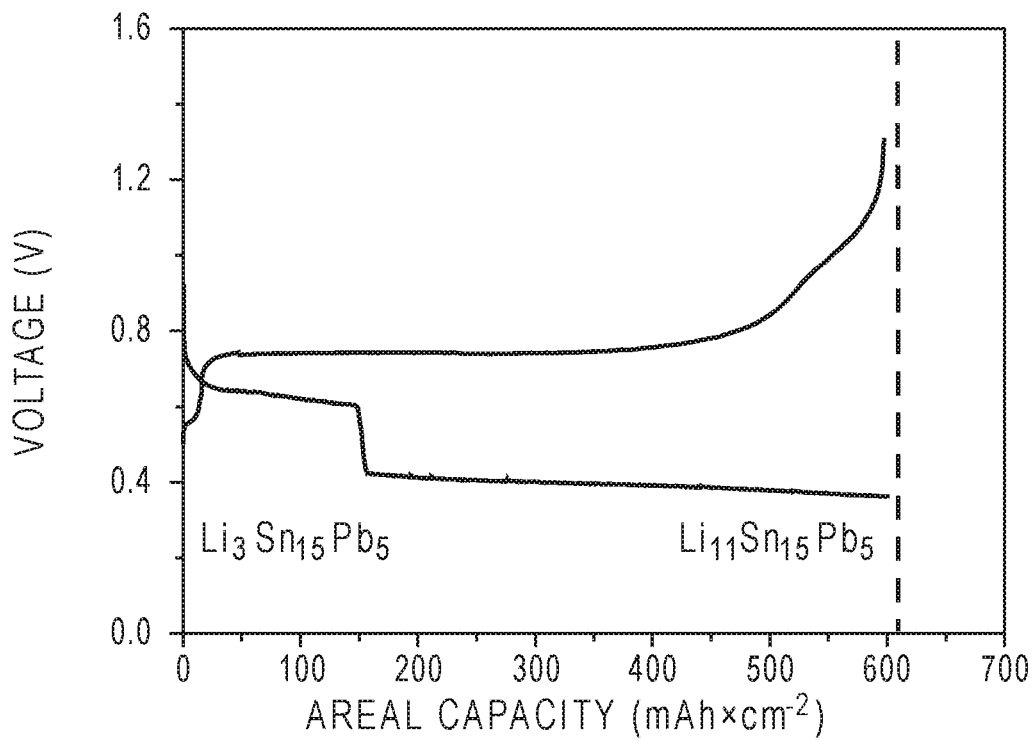
FIGS. 3A-3B show a charge-discharge (5th cycle) voltage profile (FIG. 3A) and the Columbic efficiency, energy efficiency and charge capacity density with number of cycles (FIG. 3B) for a Li∥LLZTO∥Sn—Pb cell operating at a temperature of 240° C. and a current density of 50 mA×cm$^{-2}$. The discharge capacity was set at 600 mAh×cm$^{-2}$ and the charge cut-off voltage was set at 1.3V. The operating temperature was 240° C. and the current density was 50 mA×cm$^{-2}$.
Figure 3B:
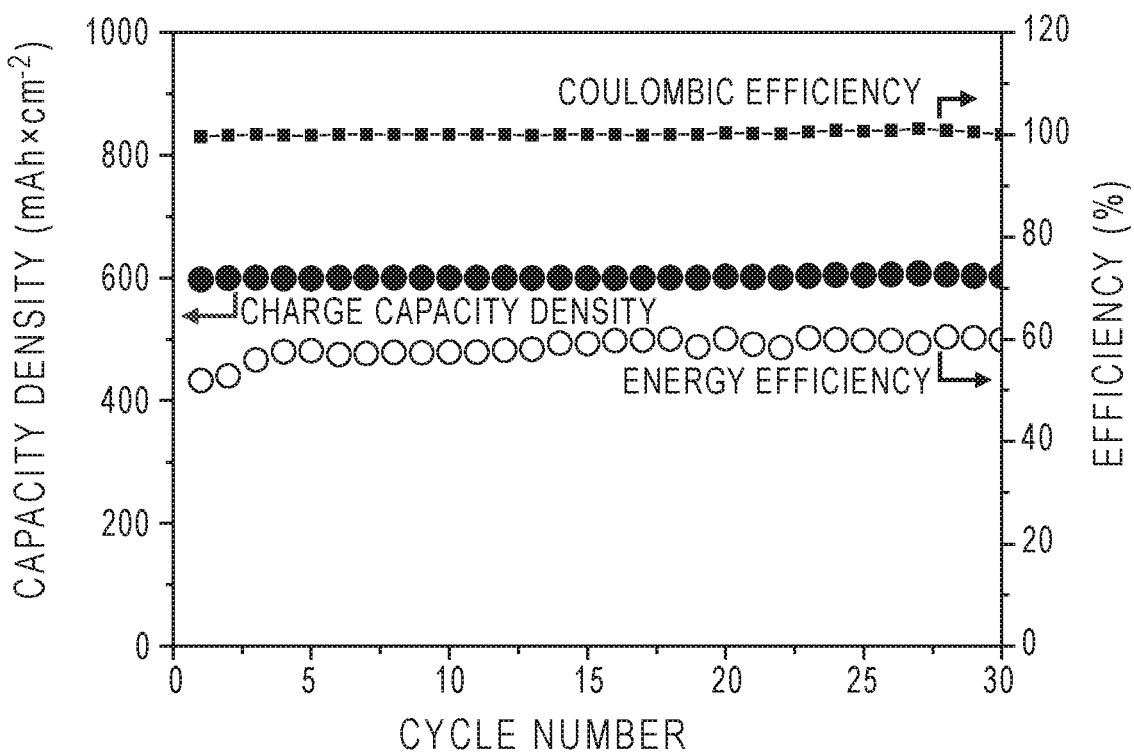

The first discharge plateau in the lithiation process of Sn—Pb alloy was employed in the Li‖LLZTO‖Sn—Pb cell as shown in FIG. 2A and FIG. 2B. Deeper discharge of the cell was also investigated. After the first voltage jump, the cell can be further discharged to achieve much higher cell capacity, as shown in FIGS. 3A-3B. As shown in FIG. 3A, there are two plateaus during the discharge process: the plateau at about 0.6 V, and a plateau at about 0.4 V. The areal capacity of the first plateau is about 150 mAh×cm$^{-2}$, and the areal capacity of the second plateau is about 450 mAh×cm$^{-2}$. During charging, there are also two voltage plateaus: a minor plateau at about 0.58 V with an areal capacity of only about 10 mAh×cm$^{-2}$, and a major plateau at about 0.76 V with an areal capacity of about 500 mAh×cm$^{-2}$. Compared to the charge-discharge voltage profile shown in FIG. 2B, resulting from the large voltage gap between the second discharge plateau and the major charge plateau, the full cycle energy efficiency of the cell decreases from about 75% in FIG. 2A to about 60%. A discharge capacity of 600 mAh×cm$^{-2}$ corresponds to a discharged cathode with a Li:Sn:Pb mole ratio of 11:15:5, which is a solid at the working temperature of 240° C.

FIGS. 2E and 2F show the freezing and thawing performance of a Li‖LLZTO‖Sn—Pb cell during charge and discharge, respectively. Sn (1.567 g) and Pb (0.91 g) were used as the cathode material.

It is commonly believed that solid precipitation in a liquid cathode-solid electrolyte cell causes the liquid-solid interface to irreversibly form a solid-solid interface, leading to an increase in the interfacial impedance between the cathode and the solid electrolyte. As applicable to a molten Na—S cell, the discharge product is typically confined to $Na_2S_5$ to prevent precipitation of solid sodium polysulfide. The accumulation of solid precipitates and/or the formation of an intermetallic compound in the Sn—Pb cathode could explain the low voltage of the second discharge plateau. However, a capacity loss is not observed in the Li‖LLZTO‖Sn—Pb or Li‖LLZTO‖Bi—Pb cells provided by the present disclosure.

As shown in FIG. 3B, the average Columbic efficiency was 99.98%. These results indicate that a solid LiSnPb precipitate in the liquid cathode is converted back to a liquid Sn—Pb alloy. As a result, the accessible capacity of the cell can be increased during use by discharging the cell to the second plateau, but with a commensurate decrease in energy efficiency.

The ability of a LLZTO solid electrolyte to withstand thermal cycling is important because the differential thermal expansion of the cell components, and in particular the cathode in either a charged or discharged state, may lead to mechanical failure of the LLZTO solid electrolyte. The ability of a Li‖LLZTO‖Sn—Pb cell to withstand thermal cycling was evaluated by cycling the temperature between 30° C. and 240° C. The results are shown in FIG. 2E.

As shown in FIG. 2E, when a Li‖LLZTO‖Sn—Pb cell was alternatively charged and discharged, thermal cycling was suspended, and the temperature of the cell decreased to 30° C. and was maintained at 30° C. for 5 h. The cell was then heated and the temperature increased and maintained at 240° C., and voltage cycling resumed. As shown in FIG. 2E, after each thermal cycle, the voltage of the Li‖LLZTO‖Sn—Pb cell consistently returned to a nominal value. No opens or shorts were observed and no fluctuations in the voltage profiles were observed. These results indicate that the integrity of the LLZTO electrolyte tube was maintained during thermal cycling between 30° C. and 240° C.

Figure 4A:
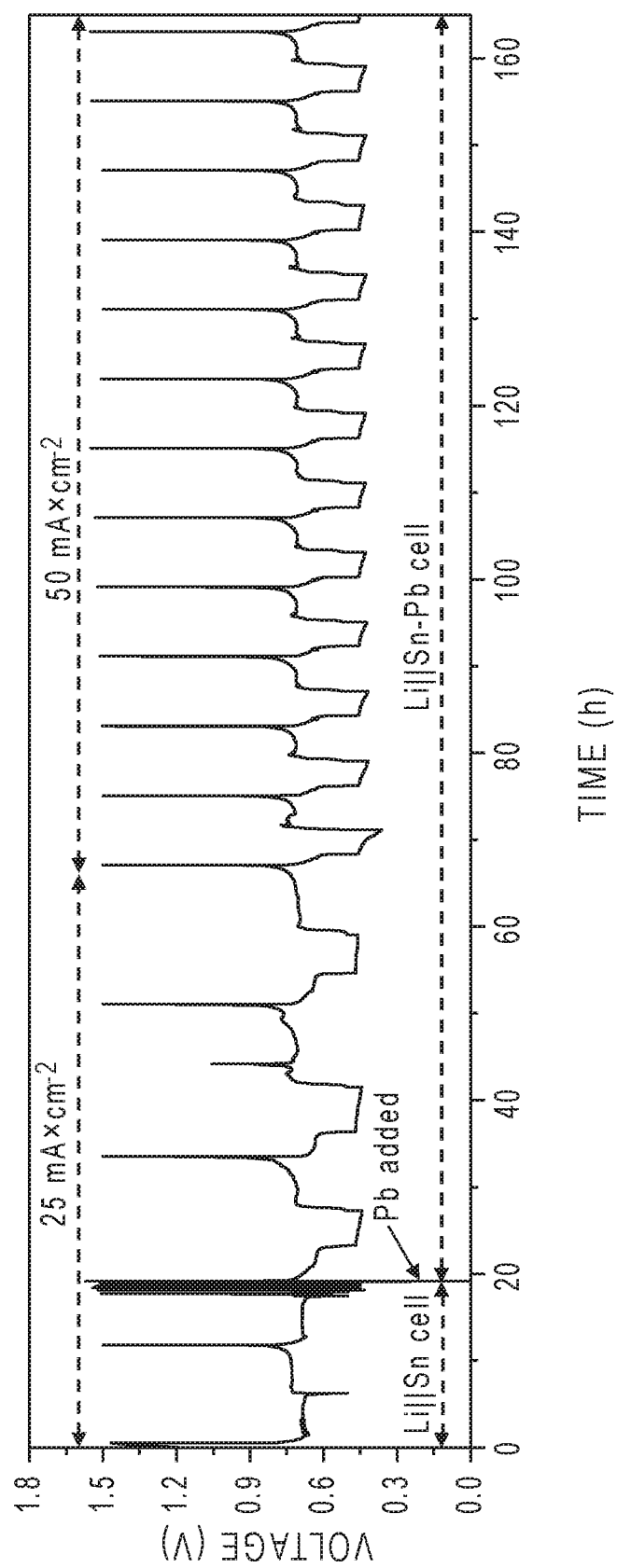
FIGS. 4A-4C show electrochemical properties for a Li∥LLZTO∥Sn cell operating at 240° C. with Pb added during operation of the cell.
Figure 4B:
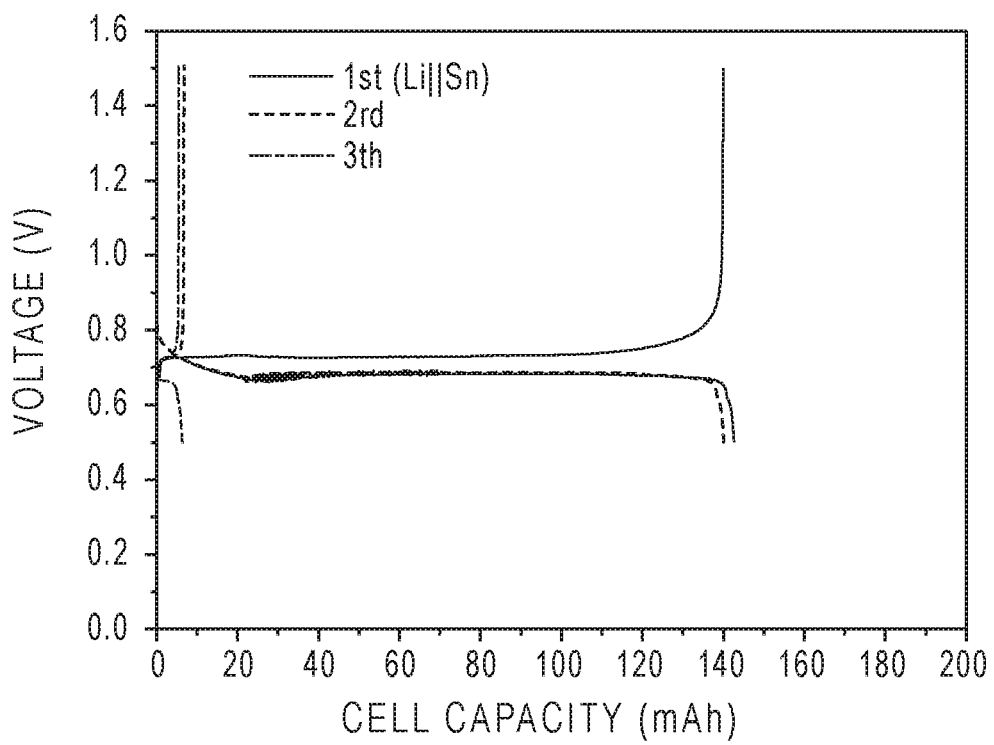
Figure 4C:
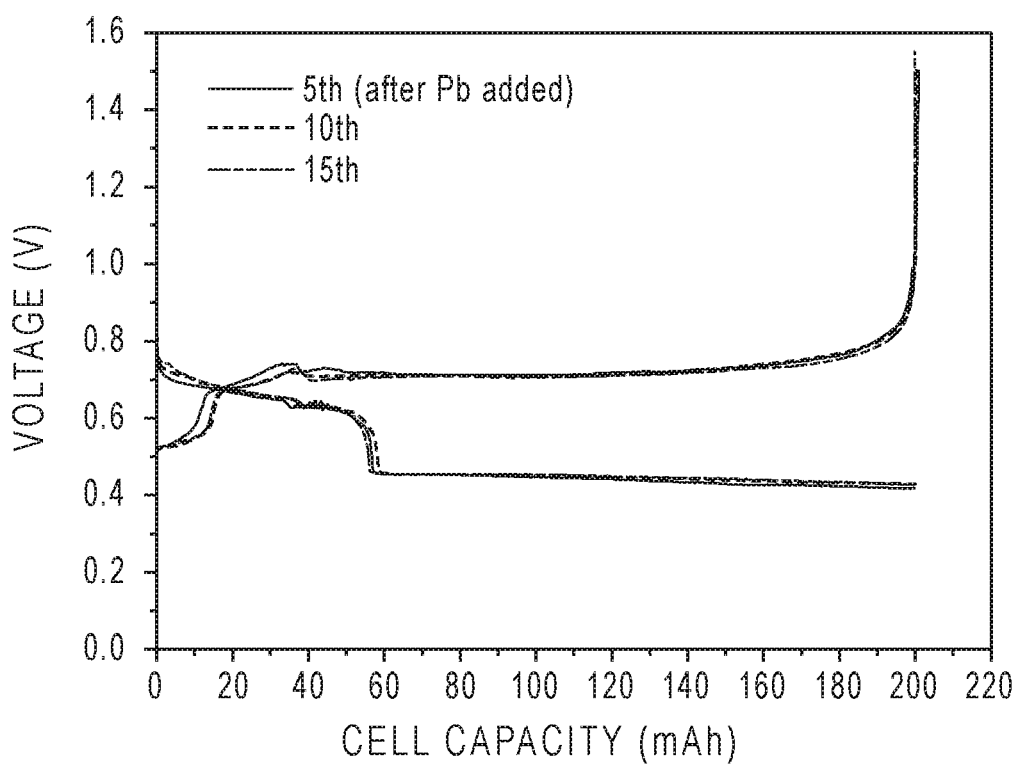

The Pb in the Sn—Pb alloy serves to improve the cyclability of the Sn—Pb cathode. At 240° C., the capacity of a Li||LLZTO||Sn cell (1.567 g Sn) decays to zero in several cycles. When 0.91 g Pb is added to the same cell, the cell capacity recovers, and the capacity is maintained during repeated charge-discharge (see FIGS. 4A-4C).

Figure 5A:
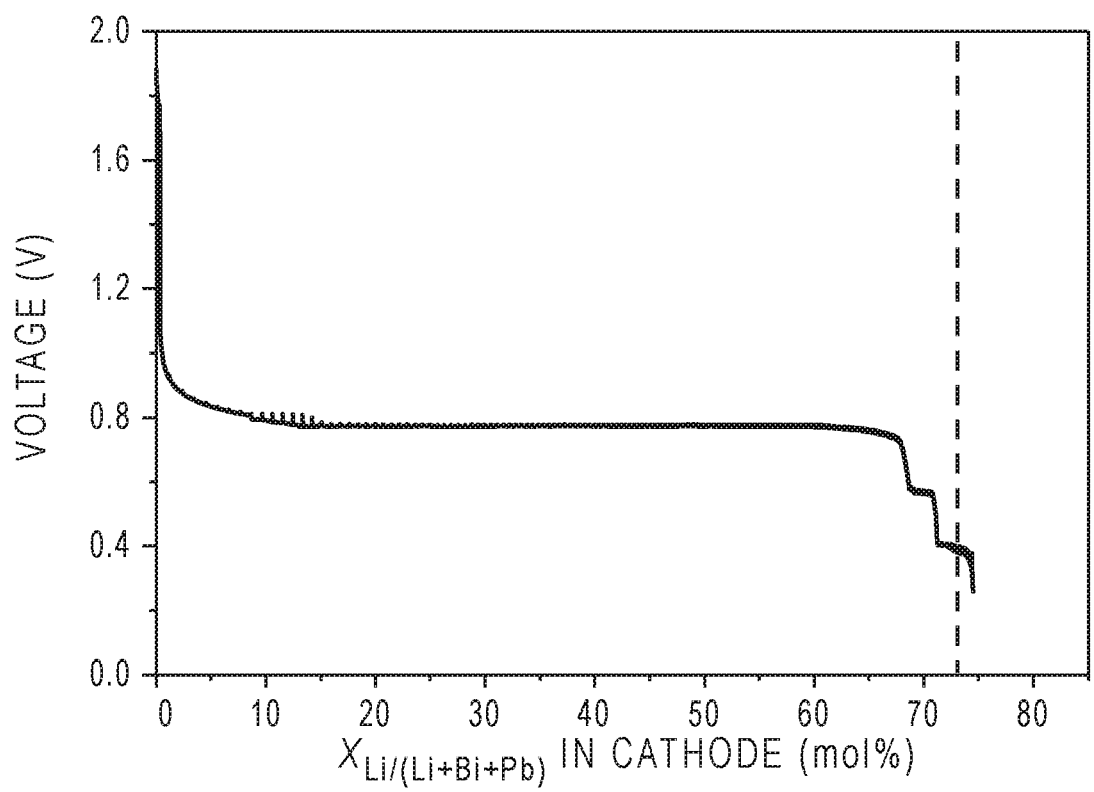
FIG. 5A shows the Coulometric titration of a Li∥LLZTO∥Bi—Pb cell operating at 240° C.

FIG. 5A shows the Coulometric titration of a Li||LLZTO||Bi—Pb cell operating at 240° C. The cell was discharged at a small current density of 5 mA×cm$^{-2}$ followed by a rest (zero current) of 10 min after every 5 mAh×cm$^{-2}$ increment of constant discharge capacity. The voltage during the rest periods represents the open circuit voltage (Voc) of the cell as a function of discharge capacity, and the difference between the voltage during rest and discharge reflect the internal resistance of the cell. As shown in FIG. 5A, there are three voltage plateaus during the discharge. The first voltage plateau at about 0.8 V ended when the Li:Bi:Pb mole ratio of the cathode was 9:3:1, and dropped to the second plateau of about 0.5 V. The second voltage plateau ended when the Li:Bi:Pb mole ratio of the cathode was 9.4:3:1, and dropped to the third plateau of about 0.4 V. The third voltage plateau ended when the Li:Bi:Pb mole ratio of the cathode was 11.5:3:1.

Figure 5B:
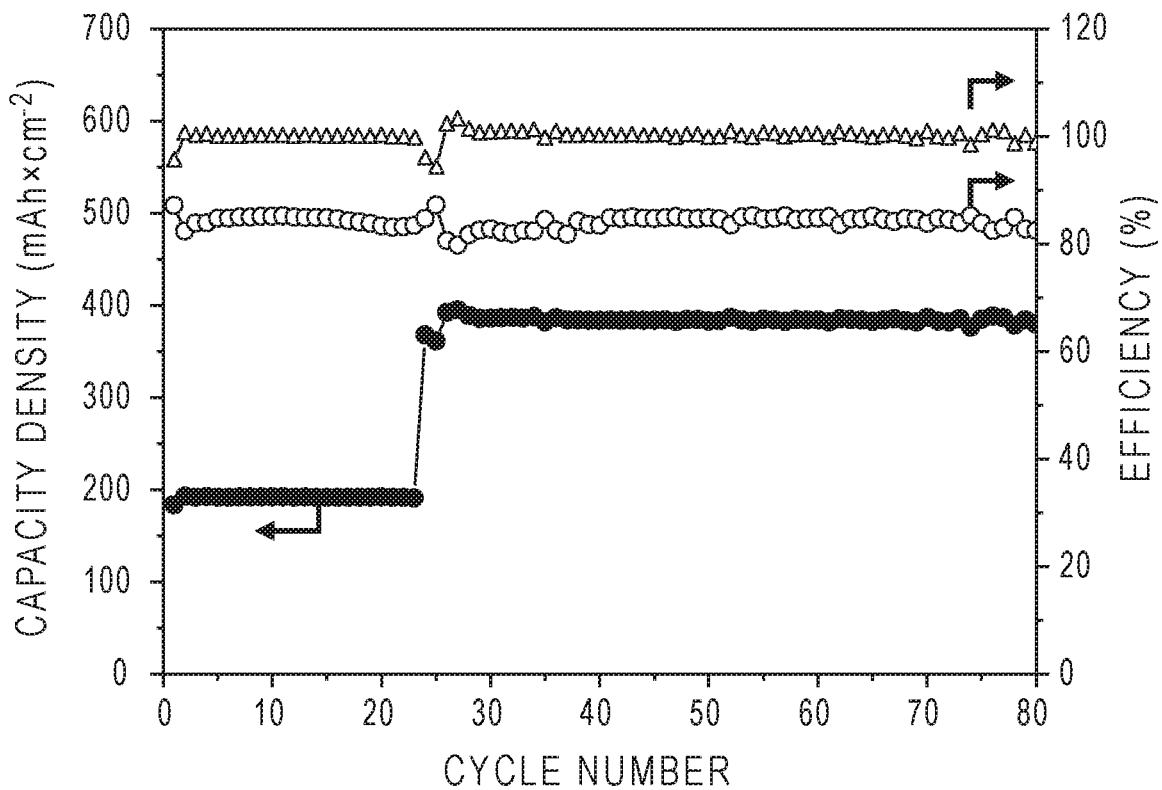
FIG. 5B shows the Coulombic efficiency, energy efficiency, and discharge areal capacity density as a function of cycle number for a Li∥LLZTO∥Bi—Pb cell at 100 mA cm$^{-2}$. The discharge capacity was set at 192 mAh×cm$^{-2}$ ($Li_{1.5}Bi_3Pb$) during the first 25 cycles and at 384 mAh×cm$^{-2}$ ($Li_3Bi_3Pb$) during the following cycles and the charge cut-off was set at 1.2V.
Figure 5C:
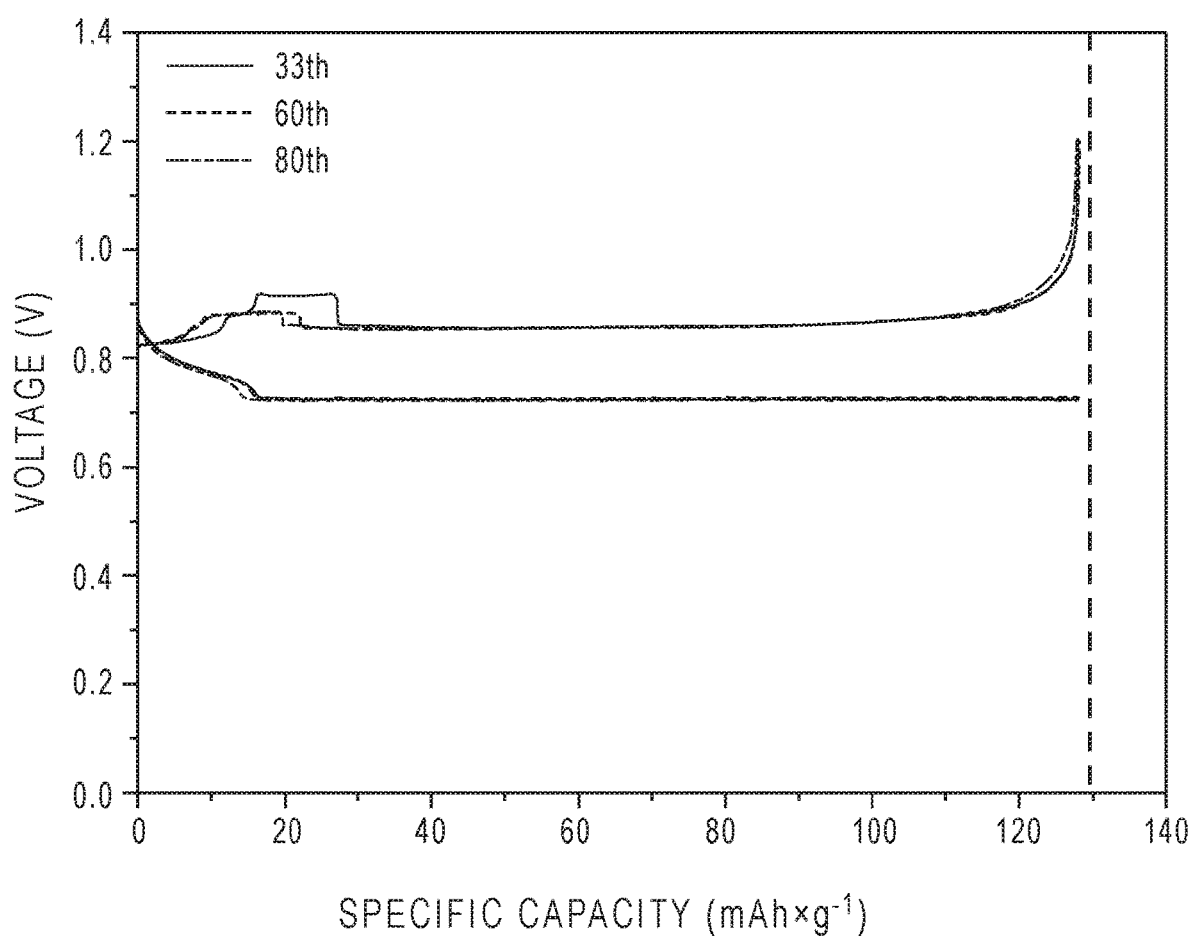
FIG. 5C shows representative charge-discharge voltage profiles for a Li∥LLZTO∥Bi—Pb cell operating at 240° C. The discharge capacity was set as 384 mAh×cm$^{-2}$ (corresponding to 128 mAh×g$^{-1}$ Bi and a discharge product of $Li_3Bi_3Pb$).

FIG. 5B and FIG. 5C show the electrochemical properties of a Li||LLZTO||Bi—Pb cell operating at a temperature of 240° C. with a current density of 100 mA cm$^{-2}$. The discharge capacity was set at 192 mAh×cm$^{-2}$, which represents $Li_{1.5}Bi_3Pb$ in the first 23 cycles and 384 mAh×cm$^{-2}$, which corresponds to $Li_3Bi_3Pb$ in the following cycles. The charge cut-off voltage was set as 1.2 V. The current density was 100 mA×cm$^{-2}$. The specific capacity of Bi metal was calculated to be 128 mAh×g$^{-1}$. The average Coulombic efficiency was about 99.98% and the average energy efficiency was about 84.1%.

Figure 5D:
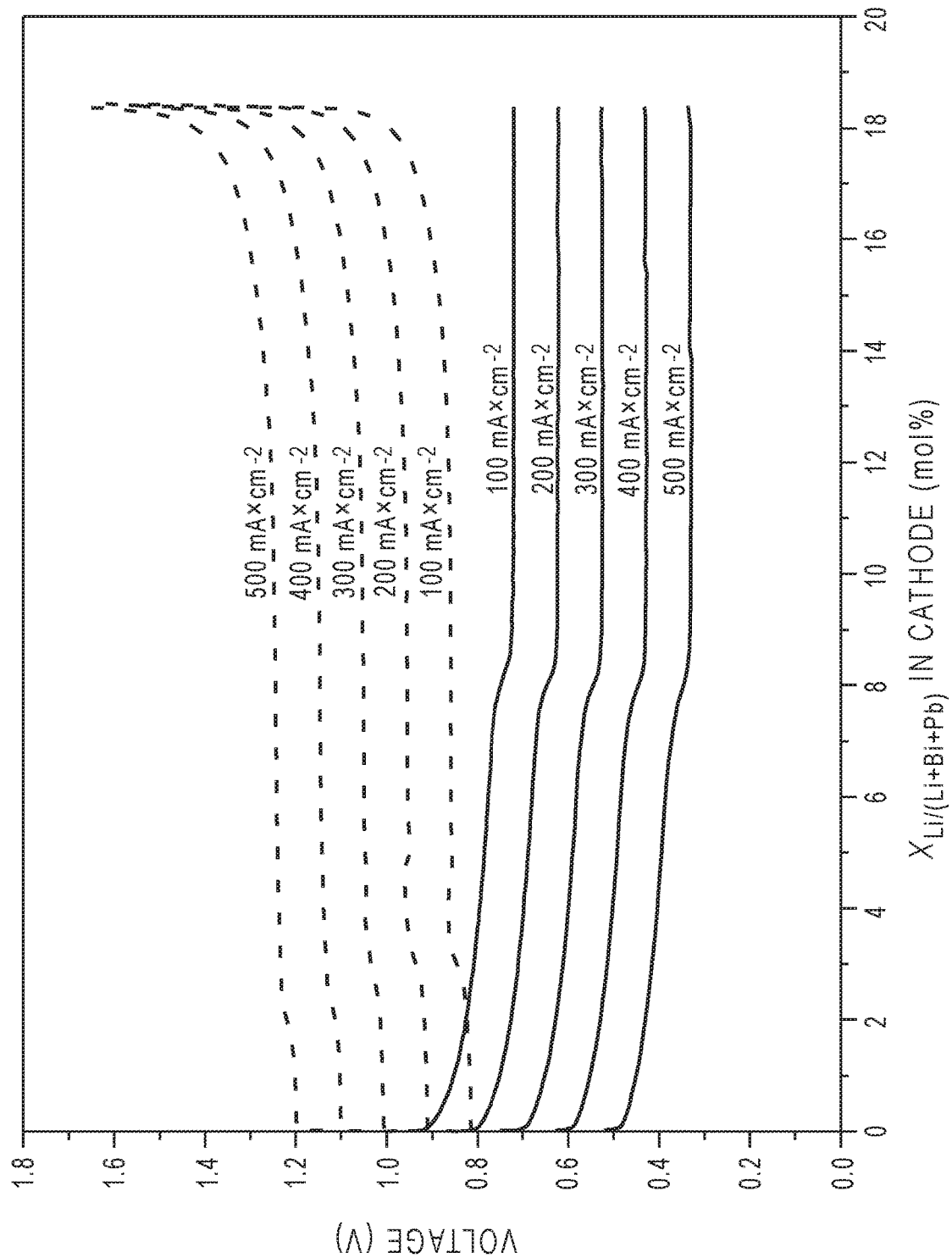
FIG. 5D shows charge-discharge voltage profiles at different current densities from 100 mA×cm$^{-2}$ to 500 mA×cm$^{-2}$ for a Li∥LLZTO∥Bi—Pb cell operating at 240° C. The cathode contained 3 g Bi and 1 g Pb.

FIG. 5D show voltage profiles for a Li||LLZTO||Bi—Pb cell at different current densities ranging from 100 mA×cm$^{-2}$ to 500 mA×cm$^{-2}$. For each current density increment of 100 mA×cm$^{-2}$, the average discharge voltage decreased by only 100 mV. Even at a high current density of 500 mA×cm$^{-2}$, the Li||LLZTO||Bi—Pb cell exhibited good cycle performance with a discharge voltage plateau of about 0.35V (175 mW×cm$^{-2}$). Freezing and thawing performance of a Li||LLZTO||Bi—Pb cell is shown in FIGS. 6A and 6B. The results demonstrate that the integrity of the Li||LLZTO||Bi—Pb cell is maintained during temperature cycling.

To assess the safety of a solid electrolyte-based molten lithium cell provided by the present disclosure, a puncturing test was performed on a Li||LLZTO||Sn—Pb cell. A LLZTO tube filled with 15 g of a molten Sn—Pb alloy was placed in a stainless steel case and the gap filled with molten lithium (about 2 g). The cell was heated in a box furnace to 300° C. The lithium metal and Sn—Pb alloy liquified when the surface temperature of the stainless steel case was 143° C. The LLZTO tube was then broken and the molten lithium and molten Sn—Pb alloy allowed to combine. The temperature increased to 213° C. and the integrity of the stainless steel case was maintained. The temperature increase of about 80° C. is within an acceptable range.

Compared to cells employing a lithium salt electrolyte, the use of a molten lithium anode in combination with a garnet-type solid electrolyte eliminates self-discharge and significantly increases the Columbic efficiency of a cell, and at the same time allows for a reduction in the operating temperature of the cell. The operating temperature of Li||LLZTO||Sn—Pb and Li||LLZTO||Bi—Pb cells provided by the present disclosure are lower than that of other molten lithium batteries. The low operating temperature reduces the oxidation and corrosion rate of the cell materials (particularly of the cell packaging materials in air atmosphere), and also facilitates the use of polymer seals.

In summary, by using a garnet-type LLZTO solid electrolyte, a molten lithium metal cell operating at a temperature less than 300° C. such as about 240° C. can exhibit a high Columbic efficiency of 99.98%, a high energy efficiency of at least 84%, a high-power capability, and a deep discharge.

An electrochemical cell provided by the present disclosure can exhibit a Columbic efficiency of at least 99.0% and an energy efficiency of at least 60% at a current density of 50 mA×cm$^{-2}$ and a temperature of 240° C.

An electrochemical cell provided by the present disclosure can exhibit a Columbic efficiency of at least 99% and an energy efficiency of at least 80% at a current density of 50 mA×cm$^{-2}$ and a temperature of 240° C.

An electrochemical cell provided by the present disclosure can exhibit a Columbic efficiency of at least 99% and an energy efficiency of at least 90% at a current density of 50 mA×cm$^{-2}$ and a temperature of 240° C.

An electrochemical cell provided by the present disclosure can exhibit a current density of at least 300 mA×cm$^{-2}$ at a temperature of 240° C., at least 350 mA×cm$^{-2}$ at a temperature of 240° C., or at least 400 mA×cm$^{-2}$ at a temperature of 240° C.

Using a stainless-steel cylinder with a height of 70 mm and a diameter of 30 mm as the cell package (see FIG. 1), a Li||LLZTO||Bi—Pb cell can provide a capacity of 45 Ah with an average discharge voltage of 0.7 V (discharge to $Li_3Bi_3Pb$).

In Li||LLZTO||Sn—Pb and Li||LLZTO||Bi—Pb cells provided by the present disclosure, the Li concentration can be 35.5 mol % ($Li_{11}Sn_{15}Pb_5$) and 42.8 mol % ($Li_3Bi_3Pb$), respectively. For example, the amount of lithium in a Li||LLZTO||Sn—Pb cell can be from 30 mol % to 40 mol %, based on the total moles of Li, Sn, and Pb in the solid electrolyte. For example, the amount of lithium in a Li||LLZTO||Bi—Pb cell can be from 35 mol % to 50 mol %, based on the total moles of Li, Bi, and Pb in the solid electrolyte. The theoretical Li concentration can be up 64.2% ($Li_{36}Sn_{15}Pb_5$, see FIG. 7) for a Li||LLZTO||Sn—Pb cell and can be up to 73.3% ($Li_{11}Bi_3Pb$, see FIG. 5A) for a Li||LLZTO||Bi—Pb.

Coulometric titration of a Li||LLZTO||Sn—Pb cell was performed by discharging the cell at a current density of 2 mA×cm$^{-2}$ followed by 0 current for 10 min after every 2 mA×cm$^{-2}$ increment of constant charge capacity.

For example, increasing the Li concentration of a Sn—Pb cathode from $Li_{11}Sn_{15}Sb_5$ to $Li_{36}Sn_{15}Pb_5$ can result in an increase in the theoretical gravimetric energy density from 50 Wh×kg$^{-1}$ to 150 Wh×kg$^{-1}$, and the theoretical volumetric energy density from 300 Wh×L$^{-1}$ to 570 Wh×L$^{-1}$.

Increasing the Li concentration of a Bi—Pb cathode from $Li_3Bi_3Pb$ to $Li_{11}Bi_3Pb$ can result in an increase in the theoretical volumetric energy density from 70 Wh×kg$^{-1}$ to 230 Wh×kg$^{-1}$, and the theoretical volumetric energy density from 490 Wh×L$^{-1}$ to 940 Wh×L$^{-1}$.

The performance of a cell provided by the present disclosure can be improved by using a cathode having a larger capacity and that is able to operate at a higher voltage.

Electrochemical cells provided by the present disclosure having a molten lithium metal or molten lithium alloy and a solid electrolyte can exhibit, for example, low electrode-electrolyte interface impedance, a current density of at least 100 mA cm$^{-2}$ at a temperature of 240° C., no capacity decay during repeated voltage cycling, a Columbic efficiency of at least 99.98% at a temperature of 240° C., an energy efficiency of at least 84% at a temperature of 240° C., voltage cycling at current densities up to 500 mA×cm$^{-2}$, continuous operation at temperatures less than 250° C., and recovery from thermal cycling between 25° C. and 300° C.

Electrochemical cells provided by the present disclosure can be used in batteries and power modules comprising more than one of the electrochemical cells. A power system can comprise more than one electrochemical cell and/or power modules. The electrochemical cells and power modules can be used to store electrical energy and to discharge electrical energy to power grids. Accordingly, aspects of the invention include power systems and power grids incorporating the electrochemical cells provided by the present disclosure.

EXAMPLES

Example 1

Characterization of LLZTO Solid Electrolyte

A LLZTO solid electrolyte was fabricated as follows.

$La_2O_3$, $ZrO_2$, $Li_2CO_3$, and $Ta_2O_5$ were combined and pre-sintered at 900° C. for 6 h. The sintered pre-form was ground and $Al_2O_3$ was added to form a LLZTO precursor powder. The LLZTO precursor powder was cold isostatic pressed at 220 MPa for 90 sec to from a green compacted preform. The compacted preform was calcined at 1,140° C. for 16 hours to form a LLZTO electrolyte tube having a closed end and an open end. The LLZTO tubes had the following dimensions: height: 6 cm; inner diameter: 1 cm, wall thickness: 0.2 cm.

The LLZTO composition was $Li_{6.4}La_3Ta_{0.6}Zr_{1.4}O_{12}$.

The ionic conductivity at temperatures from 25° C. to 300° C. of a 0.3 cm-thick section of LLZTO material is shown in FIG. 8. The ionic conductivity ranged from 3.5× 10$^{-4}$ mS×cm$^{-1}$ at 25° C., 0.085 mS×cm$^{-1}$ at 240° C., and to about 0.13 mS×cm$^{-1}$ at 300° C. The results show that the ionic conductivity of a LLZTO pellet (composition) can reach 85 mS×cm$^{-1}$ at 240° C., which is about 240 times higher than the room temperature ionic conductivity at 25° C. (0.35 mS×cm$^{-1}$), and is higher than the ionic conductivity of organic liquid electrolytes at 25° C. (about 10 mS×cm$^{-1}$, 1 mol LiPF$_6$ salt in 1:1 ethylene carbonate-ethyl methyl carbonate electrolyte at 30° C.).

The impedance of a 0.3 cm-thick section of a LLZTO material at temperatures from 25° C. to 300° C. as determined by electrochemical impedance spectroscopy (EIS) is shown in FIG. 9.

Figure 10A:
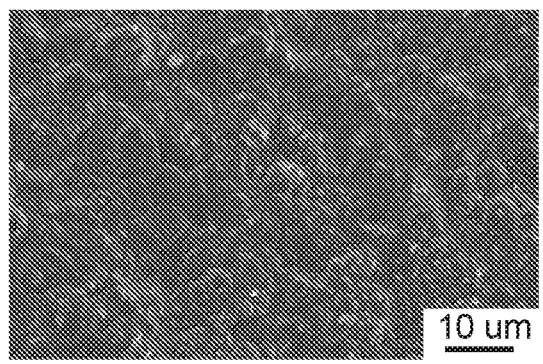
Figure 10B:
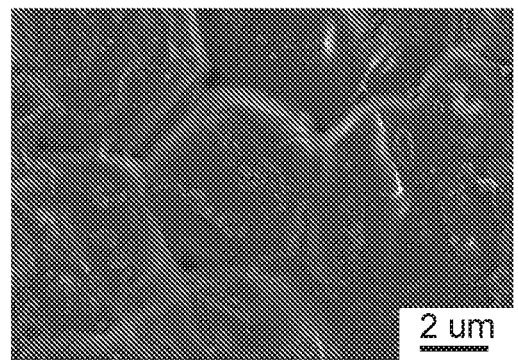
Figure 10C:
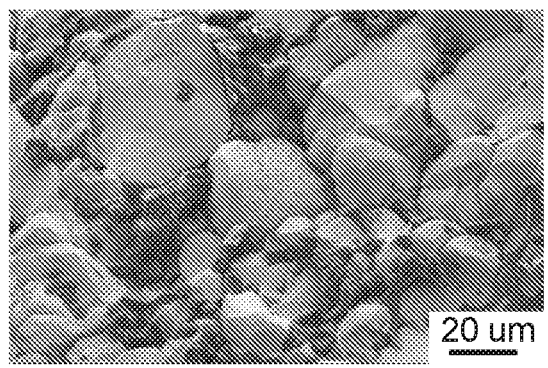
Figure 10D:
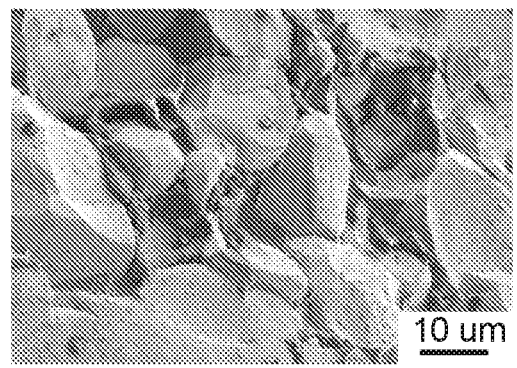

The relative density of the LLZTO material was as high as 99% as determined by the Archimedes method with ethanol. Scanning electron microscopy (SEM) images taken from both the surface and cross-section of the LLZTO tube also confirm the dense structure. SEM images of the surface and interior of the LLZTO material are shown in FIGS. 10A-10D. FIGS. 10A and 10B show SEM images of the surface of the LLZTO material at two different magnifications, and FIGS. 10C and 10D show SEM images of the interior of an LLZTO electrolyte tube at two different magnifications. The high relative density of the LLZTO tube can minimize or prevent leakage or cross-over of the liquid electrode materials, can result in a negligible self-discharge rate, and can improve the safety and reliability of the cell.

The mechanical strength and permeability of the LLZTO material was determined by applying an air pressure differential across a 200 μm-thick section. The results are shown in FIG. 11, and demonstrate that the LLZTO section was able to withstand a pressure differential up to about 130 kPa and was impermeable throughout a range of pressures from 0 kPa to about 130 kPa.

To determine the impermeability and mechanical strength of the LLZTO solid electrolyte, a gas leak test was performed using a pressure of nitrogen gas. The gas flow rate across a 200 um-thick LLZTO sheet remained zero until the sheet ruptured at a pressure of 130 kPa. This result confirms the impermeability of the LLZTO solid electrolyte, which is directly related to the lithium anode protection and liquid lithium blocking ability of the electrolyte. It is anticipated that in practical application, the LLZTO solid electrolyte will experience similar pressures resulting from thermal expansion of the molten electrolytes.

For grid energy storage applications, long service lifetime is an important factor, which imposes a requirement that an LLZTO solid electrolyte be mechanically and chemically stable for an extended period of time in continuous contact with corrosive molten lithium. The stability of the LLZTO tube against molten lithium was determined by X-ray diffraction (XRD) analysis of a LLZTO tube following immersion in molten lithium at 300° C. for 2 months.

A sample of the LLZTO solid electrolyte was immersed in molten lithium metal at a temperature of 300° C. for 2 months. The XRD pattern was measured before and after immersion and the results are shown in FIG. 12. The XRD pattern of the LLZTO solid electrolyte was characteristic of the cubic garnet phase LLZTO ($Li_5La_3Nb_2O_{12}$) both before and after exposure to molten lithium metal.

The Raman spectrum of the LLZTO solid electrolyte was also measured before and following exposure to molten lithium metal for 2 months at 300° C. The results are shown in FIG. 13. The Raman spectra are characteristic of the cubic garnet phase of LLZTO ($Li_5La_3Nb_2O_{12}$) both before and following extended immersion in molten lithium metal.

The stability of the LLZTO solid electrolyte following exposure to molten lithium metal was also characterized by electron dispersive spectroscopy (EDS). FIG. 14A shows an EDS line analysis of a cross-section of a LLZTO solid electrolyte immersed in molten lithium metal for 2 months at 300° C. and FIGS. 14B-14E show the EDS intensity of the elements Al, La, Zr, and Ta, respectively. The EDS spectra show that aluminum remains concentrated at the grain boundaries, thereby demonstrating that the grain boundary morphology of the LLZTO solid electrolyte is maintained following long-term exposure to molten lithium.

Based on the characterization of LLZTO following long term exposure to molten lithium, there was no lithium penetration into the LLZTO solid electrolyte, no morphology change, and no phase change, thereby demonstrating the chemical and mechanical stability of LLZTO solid electrolyte tubes at high temperatures.

Example 2

Li‖LLZTO‖Sn—Pb and Li‖LLZTO‖Bi—Pb Electrochemical Cells

Electrochemical cells having a lithium metal anode, a LLZTO solid electrolyte, and a Sn—Pb or Bi—Pb cathode was assembled.

A Sn—Pb eutectic alloy (Sn:Pb: 75:25 mol %) and a Bi—Pb alloy (Bi:Pb: 75:25 mol %) were selected as the cathode material because of the high lithiation plateau and the low melting point of the alloys (183° C. for Sn—Pb alloy and 197° C. for Bi—Pb alloy).

To form the LLZTO solid electrolyte, $Li_2CO_3$ (Sinopharm Chemical Reagent Co., Ltd, 99.99%), $La_2O_3$ (Sinopharm Chemical Reagent Co., Ltd, 99.99%, dried at 900° C. for 12 h), $ZrO_2$ (Aladdin, 99.99%) and $Ta_2O_5$ (Ourchem, 99.99%) powders were combined at a molar ratio of $Li_{6.5}La_3Zr_{0.5}Ta_{1.5}O_{12}$ (30% excess $Li_2CO_3$ was added) and ground with an agate mortar and pestle and then heated at 900° C. for 6 h to decompose the metal salts. The resulting powders were ball-milled for 12 h, and then pressed into a U-shaped tube under 220 MPa cold isostatic pressing for 90 sec. The tubes were then annealed at 1140° C. for 16 h in air while the tubes were covered with the same mother powder. All heat treatments were conducted in alumina crucibles (>99% $Al_2O_3$) covered with alumina lids.

The Archimedes water displacement method was used to measure the relative density of the LLZTO tube. XRD (Bruker AXS D8 Advanced with Da Vinci) was used to monitor phase formation. The microstructure of the LLZTO tube was examined using a field-emission scanning electron microscope (SEM) (Shimadzu SSX-550). A broadband dielectric spectrometer (NOVOCOOL) was used for the electrochemical impedance spectroscopy measurements (EIS) (frequency range: 40 Hz-10 MHz; AC voltage: 10 mV; temperature: 25° C. to 300° C.).

To assemble an electrochemical cell, the cathode materials, Sn and Pb particles (75:25 mol %) or Bi and Pb particles (75:25 mol %) were first placed into a stainless-steel cell and heated for 1 h at 400° C. in a box furnace (MTI) to form a Sn—Pb alloy with melting point of 183° C., or a Bi—Pb alloy with melting point of 197° C.

Lithium metal was then placed into the garnet-type LLZTO tube and heated in a box furnace (MTI) at 240° C. for 20 min to melt the lithium metal. The LLZTO tube with molten lithium inside was then placed into the molten Sn—Pb or Bi—Pb alloy at 240° C. A 1 mm-diameter stainless steel rod was inserted into the molten lithium as the anode current collector. After the cell cooled to room temperature (25° C.), a layer of a silicone rubber adhesive was applied to a stainless-steel cap and pressed onto the cell to seal the anode and cathode. The assembly process was conducted in an argon atmosphere glove box.

The Li‖LLZTO‖Sn—Pb and Li‖LLZTO‖Bi—Pb cells were operated at a temperature of 240° C., which is above the melting point of both electrodes (Li metal anode; and Sn—Pb alloy or Bi—Pb alloy cathode).

The electrochemical performance of the Li‖LLZTO‖Sn—Pb and Li‖LLZTO‖Bi—Pb cells was tested in an argon-filled box furnace (MTI) at 240° C., using a cell test system (LAND 2001 CT battery tester). The active surface area of all the cells was 1 $cm^2$ estimated by the contact area between the LLZTO tube and the molten lithium. The electrochemical properties of these cells are discussed in the preceding section.

Example 3

Li‖LLZTO‖S, Li‖LLZTO‖$AlCl_3$—LiCl, and Li‖LLZTO‖Se Electrochemical Cells

Electrochemical cells having a lithium metal anode, a LLZTO solid electrolyte, and either a sulfur, a $AlCl_3$—LiCl, or a selenium cathode was assembled as described in Example 2 for the Li‖LLZTO‖Sn—Pb and Li‖LLZTO‖Bi—Pb cells.

The electrochemical performance of the Li‖LLZTO‖S, Li‖LLZTO‖$AlCl_3$—LiCl, and Li‖LLZTO‖Se cells was tested in an argon-filled box furnace (MTI) at either 210° C. or 240° C., using a cell test system (LAND 2001 CT battery tester). The active surface area of all the cells was 1 $cm^2$ estimated by the contact area between the LLZTO tube and the anode material.

The electrochemical performance of these cells is shown in FIGS. 15-17.

Aspects of the Invention

Aspect 1. An electrochemical cell, comprising: an anode, wherein the anode comprises lithium metal or a lithium alloy; a cathode in spaced relation to the anode, wherein the cathode comprises a cathode material reactive with the anode; and a solid electrolyte positioned between the anode and the cathode, wherein the solid electrolyte comprises a lithium ion conductive oxide, a lithium ion conductive phosphate, a lithium ion conductive sulfide, or a combination of any of the foregoing.

Aspect 2. The electrochemical cell of aspect 1, wherein the lithium metal comprises molten lithium metal, or the lithium alloy comprises a molten lithium alloy.

Aspect 3. The electrochemical cell of aspect 1, wherein the lithium alloy comprises Li—Al, Li—Ag, Li—Si, or Li—Sn.

Aspect 4. The electrochemical cell of any one of aspects 1 to 3, wherein the solid electrolyte comprises a lithium ion conductive oxide.

Aspect 5. The electrochemical cell of aspect 4, wherein the lithium ion conductive oxide comprises a garnet-type oxide, a lithium super ionic conductor (LISICON)-type oxide, a perovskite type oxide, or a combination of any of the foregoing.

Aspect 6. The electrochemical cell of aspect 4, wherein the lithium ion conductive oxide comprises a garnet-type oxide.

Aspect 7. The electrochemical cell of aspect 6, wherein the garnet-type oxide comprises Ta-doped $Li_7La_3Zr_2O_{12}$.

Aspect 8. The electrochemical cell of aspect 6, wherein the garnet-type oxide comprises $Li_{7-x}La_3Zr_{2-x}Ta_xO_{12}$ wherein x is from 0.1 to 1.0.

Aspect 9. The electrochemical cell of aspect 6, wherein the garnet-type oxide comprises $Li_{7-x}La_3Zr_{2-x}Ta_xO_{12}$ wherein x is from 0.4 to 0.6.

Aspect 10. The electrochemical cell of aspect 6, wherein the garnet-type oxide comprises $Li_{6.6}La_3Zr_{1.6}Ta_{0.4}O_{12}$.

Aspect 11. The electrochemical cell of aspect 6, wherein the garnet-type oxide comprises $Li_{6.5}La_3Zr_{1.5}Ta_{0.5}O_{12}$.

Aspect 12. The cell of aspect 1, wherein the solid electrolyte comprises a lithium ion conductive phosphate.

Aspect 13. The electrochemical cell of aspect 12, wherein the lithium ion conductive phosphate comprises $Li_{1.4}Al_{0.4}Ti_{1.6}(PO_4)_3$, $LiZr_2(PO_4)_3$, $LiSn_2(PO_4)_3$, $Li_{1+x}Al_xGe_{2-x}(PO_4)_3$, or a combination of any of the foregoing.

Aspect 14. The electrochemical cell of aspect 1, wherein the solid electrolyte comprises a lithium ion conductive sulfide.

Aspect 15. The electrochemical cell of aspect 14, wherein the lithium ion conductive sulfide comprises $Li_2S$—$SiS_2$, $Li_2S$—$GeS_2$—$P_2S_5$, or a combination thereof.

Aspect 16. The electrochemical cell of any one of aspects 1 to 15, wherein the cathode material comprises a metallic material, a non-metallic material, or a gaseous material.

Aspect 17. The electrochemical cell of aspect 16, wherein the metallic material comprises Sn, Pb, Bi, Sb, S, Se, a metal halide, a metal oxide, a metal chalcogenide, an alloy of any of the foregoing, or a combination of any of the foregoing.

Aspect 18. The electrochemical cell of aspect 16, wherein the non-metallic material comprises Sn, Pb, Bi, Sb, S, Se, a metal halide, a metal oxide, a metal chalcogenide, an alloy of any of the foregoing, or a combination of any of the foregoing.

Aspect 19. The electrochemical cell of aspect 1, wherein the cathode material comprises Sn, Pb, Bi, Sb, or an alloy of any of the foregoing.

Aspect 20. The electrochemical cell of any one of aspects 1 to 19, wherein the cathode material comprises a Sn—Pb alloy, a Bi—Pb alloy, or a combination thereof.

Aspect 21. The electrochemical cell of any one of aspects 1 to 19, wherein the cathode material comprises a Sn—Pb eutectic alloy, a Bi—Pb eutectic alloy, or a combination thereof.

Aspect 22. The electrochemical cell of any one of aspects 1 to 19, wherein the cathode material comprises a Sn—Pb eutectic alloy, wherein the eutectic alloy comprises 75.25 mol % Sn and 24.75 mol % Pb, wherein mol % is based on the total moles of Sn and Pb in the alloy.

Aspect 23. The electrochemical cell of any one of aspects 1 to 19, wherein the cathode material comprises a Sn—Pb alloy, wherein the Sn—Pb alloy comprises from 70 mol % to 80 mol % Sn, and from 20 mol % to 30 mol % Pb, wherein mol % is based on the total moles of Sn and Pb in the alloy.

Aspect 24. The electrochemical cell of claim 1, wherein the cathode material comprises a Bi—Pb eutectic alloy, wherein the eutectic alloy comprises 75.25 mol % Bi and 24.75 mol % Pb, wherein mol % is based on the total moles of Bi and Pb in the alloy.

Aspect 25. The electrochemical cell of any one of aspects 1 to 19, wherein the cathode material comprises a Bi—Pb alloy, wherein the Bi—Pb alloy comprises from 70 mol % to 80 mol % Bi, and from 20 mol % to 30 mol % Pb, wherein mol % is based on the total moles of Bi and Pb in the alloy.

Aspect 26. The electrochemical cell of any one of aspects 1 to 19, wherein the cathode material comprises S, Se, or a combination thereof.

Aspect 27. The electrochemical cell of any one of aspects 1 to 19, wherein the cathode material comprises FeS, $FeS_2$, or a combination thereof.

Aspect 28. The electrochemical cell of any one of aspects 1 to 19, wherein the cathode material comprises ferric chloride, aluminum chloride, nickel chloride, or a combination of any of the foregoing.

Aspect 29. The electrochemical cell of any one of aspects 1 to 19, wherein the cathode material comprises $Li_4Ti_5O_{12}$, $LiFePO_4$, $LiMn_2O_4$, $LiCoO_2$, $LiNi_xCo_yMn_zO_2$, $V_2O_5$, $TiO_2$, or a combination of any of the foregoing.

Aspect 30. The electrochemical cell of any one of aspects 1 to 19, wherein the cathode material comprises nitrogen, oxygen, fluorine, chlorine, bromine, iodine, or a combination of any of the foregoing.

Aspect 31. The electrochemical cell of any one of aspects 1 to 30, wherein the solid electrolyte is in a form of a cylinder or a plate.

Aspect 32. The electrochemical cell of any one of aspects 1 to 31, wherein the solid electrolyte has a cross-sectional thickness from 0.05 cm to 0.6 cm.

Aspect 33. The electrochemical cell of any one of aspects 1 to 32, wherein the solid electrolyte has a cross-sectional thickness from 0.15 cm to 0.4 cm.

Aspect 34. The electrochemical cell of any one of aspects 1 to 33, wherein the solid electrolyte has a relative density from 95% to 99.9%.

Aspect 35. The electrochemical cell of any one of aspects 1 to 34, wherein the solid electrolyte is fabricated using high-pressure cold isostatic press and spray granulation.

Aspect 36. The electrochemical cell of any one of aspects 1 to 36, wherein the cell further comprises a cathode current collector electrically connected to the cathode.

Aspect 37. The electrochemical cell of aspect 36, wherein the cathode current collector is in the form of a cylinder or plate.

Aspect 38. The electrochemical cell of any one of aspects 1 to 37, wherein the cell further comprises an anode current collector electrically connected to the anode.

Aspect 39. The electrochemical cell of aspect 38, wherein the anode current collector is in a form of a rod.

Aspect 40. The electrochemical cell of any one of aspects 1 to 39, wherein the cell further comprises a seal configured to retain the anode and the cathode material.

Aspect 41. The electrochemical cell of aspect 40, wherein the seal comprises an elastomeric material.

Aspect 42. The electrochemical cell of any one of claims 1 to 41, wherein the cell is configured to operate at a temperature ranging from 120° C. to 600° C.

Aspect 43. The electrochemical cell of any one of claims 1 to 42, wherein the cell is configured to operate at a temperature ranging from 200° C. to 300° C.

Aspect 44. The electrochemical cell of any one of claims 1 to 42, wherein the cell has a Columbic efficiency of at least 99.0% and an energy efficiency of at least 60% at a current density of 50 mA×cm$^{-2}$ and a temperature of 240° C.

Aspect 45. The electrochemical cell of any one of claims 1 to 44, wherein the cell has a Columbic efficiency of at least 99% and an energy efficiency of at least 80% at a current density of 50 mA×cm$^{-2}$ and a temperature of 240° C.

Aspect 46. The electrochemical cell of any one of claims 1 to 45, wherein the cell exhibits a current density of at least 300 mA×cm$^{-2}$ at a temperature of 240° C.

Aspect 47. A power module, wherein the power module comprises one or more of the electrochemical cells of any one of claims 1 to 46.

Aspect 48. The power module of claim 47, further comprising a thermal source configured to heat the one or more electrochemical cells.

Aspect 49. A power system, comprising one or more of the power modules of any one of claims 48 to 49.

Aspect 50. A power grid, comprising one or more of the power modules of any one of claims 47 to 48.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:
1. An electrochemical cell, comprising:
an anode, wherein the anode comprises molten lithium metal or a molten lithium alloy;
a cathode in spaced relation to the anode, wherein the cathode is a molten Sn—Pb alloy; and
a solid electrolyte in a form of a cylinder positioned between the anode and the cathode, wherein the solid electrolyte is $Li_{7-x}La_3Zr_{2-x}Ta_xO_{12}$ (LLZTO), wherein x is from 0.1 to 1.0; and
wherein the electrochemical cell is configured to operate at a temperature ranging from 200° C. to 300° C.;
the solid electrolyte has a density from 99% to 99.9%;

the molten Sn—Pb alloy comprises from 70 mol % to 80 mol % Sn, and from 20 mol % to 30 mol % Pb, wherein mol % is based on a total mole of Sn and Pb in the molten Sn—Pb alloy;

the electrochemical cell exhibits a Coulombic efficiency of at least 99.0% and an energy efficiency of at least 60% at a current density of 50 mA×cm$^{-2}$ and a temperature of 240° C.; and a discharge cut-off capacity of the electrochemical cell is 600 mAh×cm$^{-2}$, and an amount of lithium in the cathode at the discharge cut-off capacity is from 30 mol % to 40 mol %, based on a total mole of Li, Sn, and Pb in a discharged cathode.

2. The electrochemical cell of claim 1, wherein the molten lithium alloy comprises Li—Al, Li—Ag, Li—Si, or Li—Sn.

3. The electrochemical cell of claim 1, wherein x is from 0.4 to 0.6.

4. The electrochemical cell of claim 1, wherein the LLZTO is selected from the group consisting of $Li_{6.6}La_3Zr_{1.6}Ta_{0.4}O_{12}$, $Li_{6.5}La_3Zr_{1.5}Ta_{0.5}O_{12}$, or $Li_{6.4}La_3Zr_{1.4}Ta_{0.6}O_{12}$.

5. A power module, wherein the power module comprises one or more of the electrochemical cell of claim 1.

6. The power module of claim 5, further comprising a thermal source configured to heat the one or more of the electrochemical cell.

* * * * *